(12) United States Patent
Itano et al.

(10) Patent No.: US 7,919,009 B2
(45) Date of Patent: Apr. 5, 2011

(54) POLYMERIZABLE COMPOUNDS AND POLYMERIZABLE COMPOSITIONS

(75) Inventors: Kazuyuki Itano, Tokyo (JP); Hiroya Fukunaga, Tokyo (JP); Masatomi Irisawa, Tokyo (JP); Tatsunori Kobayashi, Tokyo (JP); Mineki Hasegawa, Tokyo (JP)

(73) Assignee: Adeka Corporation, Tokyo (JP)

( * ) Notice: Subject to any disclaimer, the term of this patent is extended or adjusted under 35 U.S.C. 154(b) by 0 days.

(21) Appl. No.: 12/519,865

(22) PCT Filed: Dec. 18, 2007

(86) PCT No.: PCT/JP2007/074266
§ 371 (c)(1),
(2), (4) Date: Jun. 18, 2009

(87) PCT Pub. No.: WO2008/120424
PCT Pub. Date: Oct. 9, 2008

(65) Prior Publication Data
US 2010/0032621 A1    Feb. 11, 2010

(30) Foreign Application Priority Data

Mar. 29, 2007   (JP) .................................. 2007-086364

(51) Int. Cl.
*C09K 19/00* (2006.01)
*C09K 19/06* (2006.01)
*C09K 19/52* (2006.01)
*G02F 1/1333* (2006.01)

(52) U.S. Cl. .................. 252/299.6; 252/299.01; 430/20; 430/270.1; 428/1.1; 349/117

(58) Field of Classification Search ............. 252/299.01, 252/299.1, 299.6; 430/20, 270.1; 428/1.1; 349/117
See application file for complete search history.

(56) References Cited

U.S. PATENT DOCUMENTS

| 7,476,423 B2 * | 1/2009 | Hirai ......................... 428/1.1 |
| 7,683,203 B2 * | 3/2010 | Irisawa et al. ............ 526/318.43 |
| 2006/0278851 A1 | 12/2006 | Ito et al. |

FOREIGN PATENT DOCUMENTS

| JP | 11-116534 | 4/1999 |
| JP | 11-130729 | 5/1999 |
| JP | 2002-145830 | 5/2002 |
| JP | 2003-315553 | 11/2003 |
| JP | 2003-321430 | 11/2003 |
| JP | 2005-263789 | 9/2005 |
| JP | 2005-309255 | 11/2005 |
| JP | 2007-016207 | 1/2007 |
| JP | 2007-016213 | 1/2007 |
| JP | 2007-186430 | 7/2007 |
| JP | 2007-297606 | 11/2007 |
| JP | 2007-298967 | 11/2007 |
| WO | 2006-049111 | 5/2006 |

OTHER PUBLICATIONS

International Search Report—PCT/JP2007/074266—Apr. 8, 2008.

* cited by examiner

*Primary Examiner* — Geraldina Visconti
(74) *Attorney, Agent, or Firm* — Young & Thompson

(57) ABSTRACT

A polymerizable compound represented by general formula (1) of the invention has good solvent solubility and excellent alignment control properties and optical characteristics.

In formula (1), $M^1$ and $M^2$ are each hydrogen or methyl; $X^1$ and $X^2$ are each a single bond, or an optionally branched C1-10 alkylene, alkyleneoxy or alkyleneoxycarbonyloxy; $X^3$ is optionally branched C1-10 alkylene; $Y^1$ and $Y^2$ are each an ester linkage, etc.; and rings A, B, C, and D are each a cyclic structure, such as 2,6-naphthlene.

20 Claims, No Drawings

POLYMERIZABLE COMPOUNDS AND POLYMERIZABLE COMPOSITIONS

TECHNICAL FIELD

This invention relates to a polymerizable compound having four rings and a (meth)acryloyloxy group at both terminals thereof and a polymerizable composition containing the polymerizable compound. The polymerizable composition has stable solvent-solubility and exhibits excellent alignment control properties. A polymer obtained by polymerizing the polymerizable composition has good retention of molecular alignment and is useful as an optical material providing, for example, a retardation film, a polarizer, a polarizing prism, or an optical film for a display device.

BACKGROUND ART

Liquid crystals are applied to display media in which the reversible movement of liquid crystal molecules is made use of, such as display devices typically of TN or STN mode, Besides the application to display media, liquid crystals have been studied for applicability to optical elements, such as a retardation film, a polarizer, a polarizing prism, a luminance-improving film, a low pass filter, and various optical filters, taking advantage of their anisotropy in physical properties, such as refractive index, dielectric constant, magnetic susceptibility, elastic modulus, and thermal expansion coefficient, as well as their alignment properties.

The above-described optical elements are obtained by, for example, uniformly aligning the molecules of a liquid crystal compound having a polymerizable functional group or a polymerizable composition containing the liquid crystal compound into a liquid crystal phase and irradiating the compound or the composition being in the liquid crystal phase with energy rays, such as ultraviolet rays, to cause photopolymerization. It is required to fix the aligned state of the liquid crystal compound uniformly and semi-permanently.

A polymer can be obtained by applying a polymerizable composition to a substrate and polymerizing the coating film. To obtain a polymer film with a uniform thickness, it is preferred to use the polymerizable composition in the form of a solution in a solvent. Should the polymerizable composition be insoluble in a solvent, it is very difficult to control the molecular alignment of the liquid crystal compound. Hence, it is required for the polymerizable compound or the polymerizable composition containing it to have good solubility in a solvent.

A polymerizable compound having a (meth)acrylic group as a polymerizable functional group exhibits high polymerization reactivity, and the resulting polymer has high transparency and has therefore been extensively studied for use as an optical element as described above.

Bifunctional polymerizable compounds having two (meth)acrylic groups as polymerizable functional groups are proposed, e.g., in Patent Document 1 to 7. However, using these polymerizable compounds can result in problems, such as precipitation of crystals on polymerizing or difficulty of controlling uniform alignment.

Patent Document 1: JP 11-16534A
Patent Document 2: JP 2002-145830A
Patent Document 3: JP 2003-315553A
Patent Document 4: JP 2005-263789A
Patent Document 5: JP 11-130729A
Patent Document 6: JP 2005-309255A
Patent Document 7: WO2006/049111

DISCLOSURE OF THE INVENTION

Problem to be Solved by the Invention

An object of the present invention is to provide a polymerizable compound and a polymerizable composition which have good solubility in a solvent and excellent alignment control properties and optical characteristics.

Means for Solving the Problem

The invention (according to claim 1) provides in its first aspect a polymerizable compound represented by general formula (1) below to achieve the object of the invention.

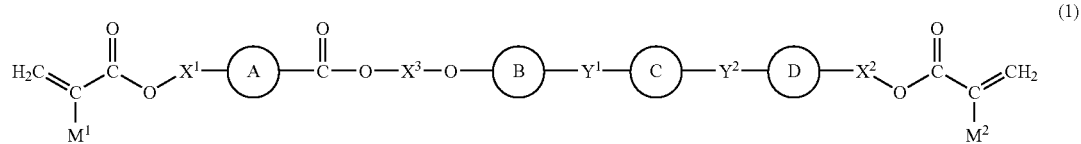

(1)

wherein $M^1$ and $M^2$ each independently represent a hydrogen atom or a methyl group, $X^1$ and $X^2$ each independently represent a single bond, an optionally branched alkylene group having 1 to 10 carbon atoms, an optionally branched alkyleneoxy group having 1 to 10 carbon atoms bonded to the adjacent ring at the oxygen atom thereof, or an optionally branched alkyleneoxycarbonyloxy group having 1 to 10 carbon atoms;

$X^3$ represents an optionally branched alkylene group having 1 to 10 carbon atoms, the —$CH_2$— moiety of which may be displaced with an oxygen atom, provided that no two oxygen atoms are adjacent to each other;

$Y^1$ and $Y^2$ each independently represent a linking group selected from a single bond, an ester linkage, an ether linkage, an optionally branched alkylene group having 2 to 8 carbon atoms which may have an unsaturated bond, and a combination thereof; and rings A, B, C, and D each independently represent a cyclic structure selected from the group consisting of 1,4-phenylene, 1,4-cyclohexylene, and 2,6-naphthylene, the cyclic structure being optionally substituted with a substituent selected from a halogen atom, an optionally branched alkyl group having 1 to 10 carbon atoms, an optionally branched alkoxy group having 1 to 10 carbon atoms, —CO—O—$R^1$, —CO—$R^2$, or —O—CO—$R^3$, wherein $R^1$, $R^2$, and $R^3$ each represent an optionally branched alkyl group having 1 to 10 carbon atoms.

The invention (according to claim 2) provides an embodiment of the polymerizable compound of general formula (1) according to claim 1, in which at least one of the cyclic structures represented by rings A, B, C, and D is 2,6-naphthylene.

The invention (according to claim 3) provides an embodiment of the polymerizable compound of general formula (1) according to claim 1 or 2, in which $Y^1$ and $Y^2$ are each —CO—O— or —O—CO—.

The invention (according to claim 4) also provides in its second aspect a polymerizable composition containing the polymerizable compound according to any one of claims 1 to 3.

The invention (according to claim 5) provides an embodiment of the polymerizable composition according to claim 4, which further contains at least one liquid crystal compound.

The invention (according to claim 6) also provides an embodiment of the polymerizable composition according to claim 5, in which the polymerizable compound is present in an amount of 1 to 30 parts by mass per 100 parts by mass of the sum of the polymerizable compound and the liquid crystal compound.

The invention (according to claim 7) also provides an embodiment of the polymerizable composition according to claim 5 or 6, in which the liquid crystal compound is represented by general formula (2):

[Chemical Formula 2]

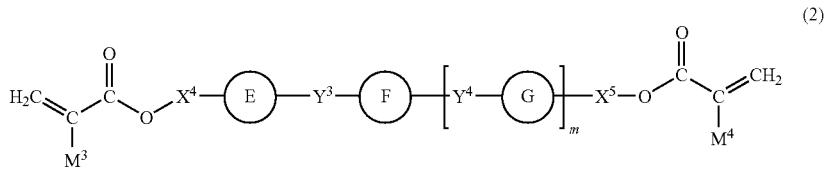

wherein $M^3$ and $M^4$ each independently represent a hydrogen atom, a halogen atom, or a methyl group;

$X^4$ and $X^5$ each independently represent a single bond, an optionally branched alkylene group having 1 to 10 carbon atoms, an optionally branched alkyleneoxy group having 1 to 10 carbon atoms bonded to the adjacent ring at the oxygen atom thereof, or an optionally branched alkyleneoxycarbonyloxy group having 1 to 10 carbon atoms;

$Y^3$ and $Y^4$ each independently represent a linking group selected from a single bond, an ester linkage, an ether linkage, an optionally branched alkylene group having 2 to 8 carbon atoms which may have an unsaturated bond, and a combination thereof; and rings E, F, and G each independently represent a cyclic structure selected from the group consisting of 1,4-phenylene, 1,4-cyclohexylene, 1,4-cyclohexenylene, and 2,6-naphthylene, the cyclic structure being optionally substituted with a substituent selected from a halogen atom, an optionally branched alkyl group having 1 to 10 carbon atoms, an optionally branched alkoxy group having 1 to 10 carbon atoms, —CO—O—$R^4$, —O—CO—$R^5$, and —CO—R, wherein $R^4$, $R^5$, and $R^6$ each represent an optionally branched alkyl group having 1 to 10 carbon atoms;

m represents an integer of 0 to 3; and when m is 2 or greater, the $Y^4$s and the rings G may be the same or different.

The invention (according to claim 8) also provides another embodiment of the polymerizable composition according to any one of claims 4 to 7, which further contains a radical polymerization initiator.

The invention (according to claim 9) provides in its third aspect a polymer obtained by photopolymerizing the polymerizable composition any one of claims 4 to 8.

The invention (according to claim 10) provides in its fourth aspect an optical film for a display device, which is formed of the polymer according to claim 9.

BEST MODE FOR CARRYING OUT THE INVENTION

The polymerizable compound of the invention, the polymerizable composition of the invention, which contains the polymerizable compound, and the polymer of the invention, which is obtained by photopolymerizing the polymerizable composition, will be described in detail based on their preferred embodiments.

The polymerizable compound of the invention will be described first.

Examples of the optionally branched alkylene group having 1 to 10 carbon atoms as represented by $X^1$, $X^2$, and $X^3$ in general formula (1) include methylene, ethylene, propylene, methylethylene, butylene, 1-methylpropylene, 2-methylpropylene, 1,2-dimethylpropylene, 1,3-dimethylpropylene, 1-methylbutylene, 2-methylbutylene, 3-methylbutylene, 4-methylbutylene, 2,4-dimethylbutylene, 1,3-dimethylbutylene, pentylene, hexylene, heptylene, octylene, nonylene, and decylene. The —CH$_2$— moiety of the alkylene group may be displaced with an oxygen atom, provided that no two oxygen atoms are adjacent to each other.

The optionally branched alkyleneoxy group having 1 to 10 carbon atoms as represented by $X^1$ and $X^2$ in general formula (1) is exemplified by the above recited alkylene groups having an oxygen atom bonded to their terminal such that it is bonded to the adjacent ring at the oxygen atom thereof.

The optionally branched alkyleneoxycarbonyloxy group as represented by $X^1$ and $X^2$ in general formula (1) is exemplified by the above recited alkylene groups having —O—CO—O— bonded to their terminal. The alkyleneoxycarbonyloxy group is bonded to the adjacent ring at the —O—CO—O— group thereof.

The single bond, the ester linkage, the ether linkage, the optionally branched alkylene group having 2 to 8 carbon atoms which may have an unsaturated bond, and the combination thereof as a linking group as represented by $Y^1$ and $Y^2$ in general formula (1) include —CO—O—, —O—CO—, —O—CO—O—, —(CH$_2$)$_a$—, —(CH$_2$)$_a$—O—, —O—(CH$_2$)$_a$—, —O—(CH$_2$)$_a$—O—, —(CH$_2$)$_a$—O—CO—, —CO—O—(CH$_2$)$_a$—, —(CH$_2$)$_a$—CO—O—, —O—CO—(CH$_2$)$_a$—, —(CH$_2$)$_a$—O—CO—O—, —O—CO—O—(CH$_2$)$_a$—, —O—(CH$_2$)$_a$—O—CO—, —CO—O—(CH$_2$)$_a$—O—, —(CH$_2$CH$_2$O)$_b$—, and —(OCH$_2$CH$_2$)$_b$—, wherein a is an integer 2 to 8, and b is an integer 1 to 3.

The halogen atom as a substituent on the cyclic structures represented by the rings A, B, C, and D in general formula (1) is exemplified by fluorine and chlorine, Examples of the optionally branched alkyl group having 1 to 10 carbon atoms as a substituent on the cyclic structures represented by the rings A, B, C, and D in general formula (1)

include methyl, ethyl, propyl, isopropyl, butyl, sec-butyl, tert-butyl, isobutyl, amyl, isoamyl, tert-amyl, hexyl, 2-hexyl, 3-hexyl, heptyl, 2-heptyl, 3-heptyl, isoheptyl, tert-heptyl, n-octyl, isooctyl, tert-octyl, 2-ethylhexyl, nonyl, isononyl, and decyl.

Examples of the optionally branched alkoxy group having 1 to 10 carbon atoms as a substituent on the cyclic structures represented by the rings A, B, C, and D in general formula (1) include methyloxy, ethyloxy, propyloxy, isopropyloxy, butyloxy, sec-butyloxy, tert-butyloxy, isobutyloxy, amyloxy, isoamyloxy, tert-amyloxy, hexyloxy, cyclohexyloxy, heptyloxy, isoheptyloxy, tert-heptyloxy, n-octyloxy, isooctyloxy, tert-octyloxy, 2-ethylhexyloxy, nonyloxy, isodecyloxy, and decyloxy.

Examples of the optionally branched alkyl group having 1 to 10 carbon atoms as represented by $R^1$, $R^2$, and $R^3$ in general formula (1) are the same as those given above.

Specific examples of the polymerizable compound represented by general formula (1) include, but are not limited to, compound Nos. 1 through 18 shown below,

[Chemical Formula 3]

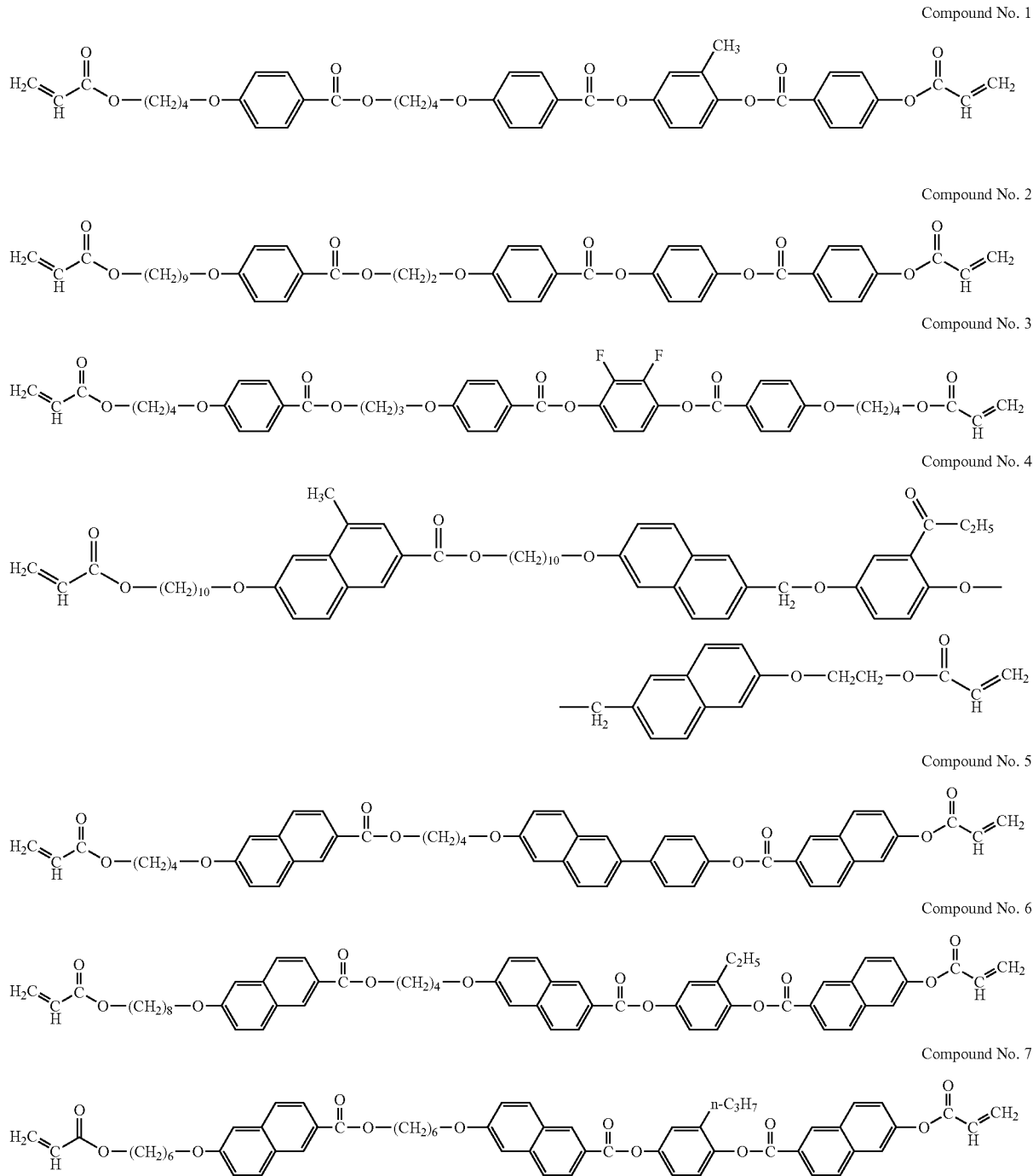

-continued
Compound No. 8
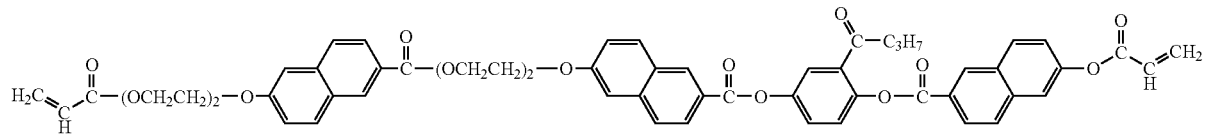
Compound No. 9
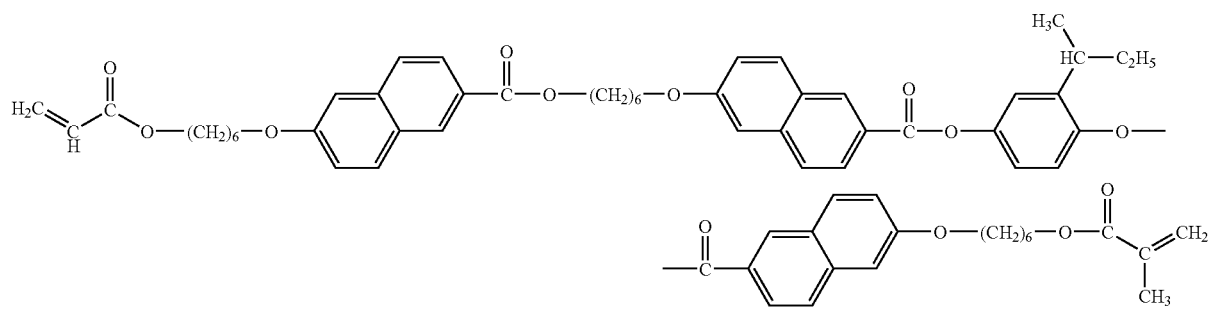
Compound No. 10
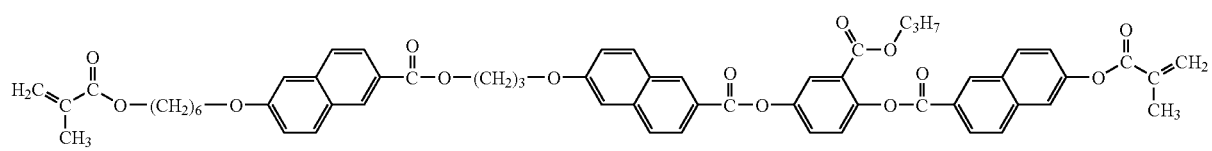
[Chemical Formula 4]
Compound No. 11
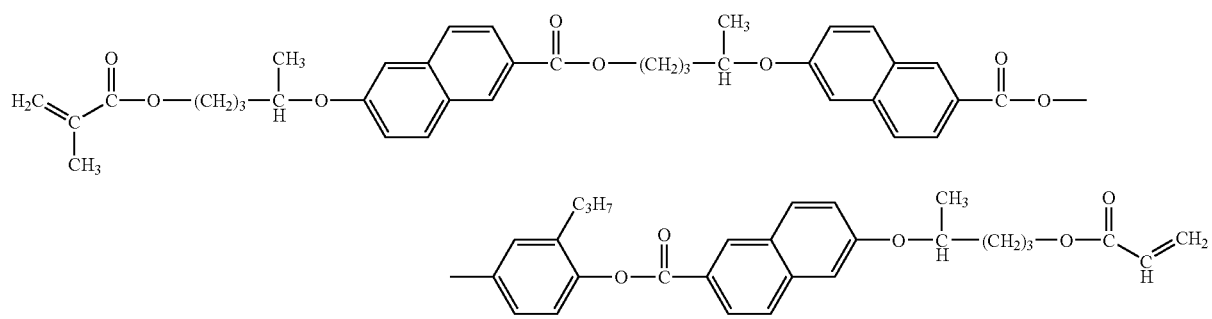
Compound No. 12
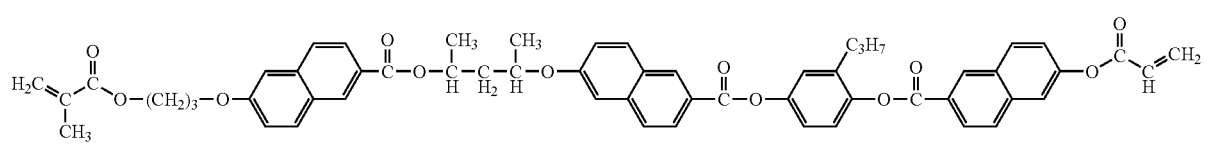
Compound No. 13
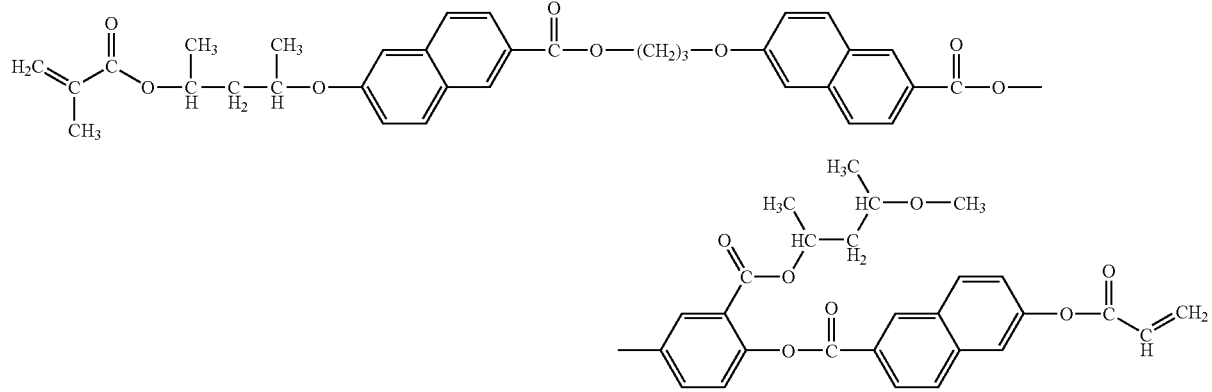

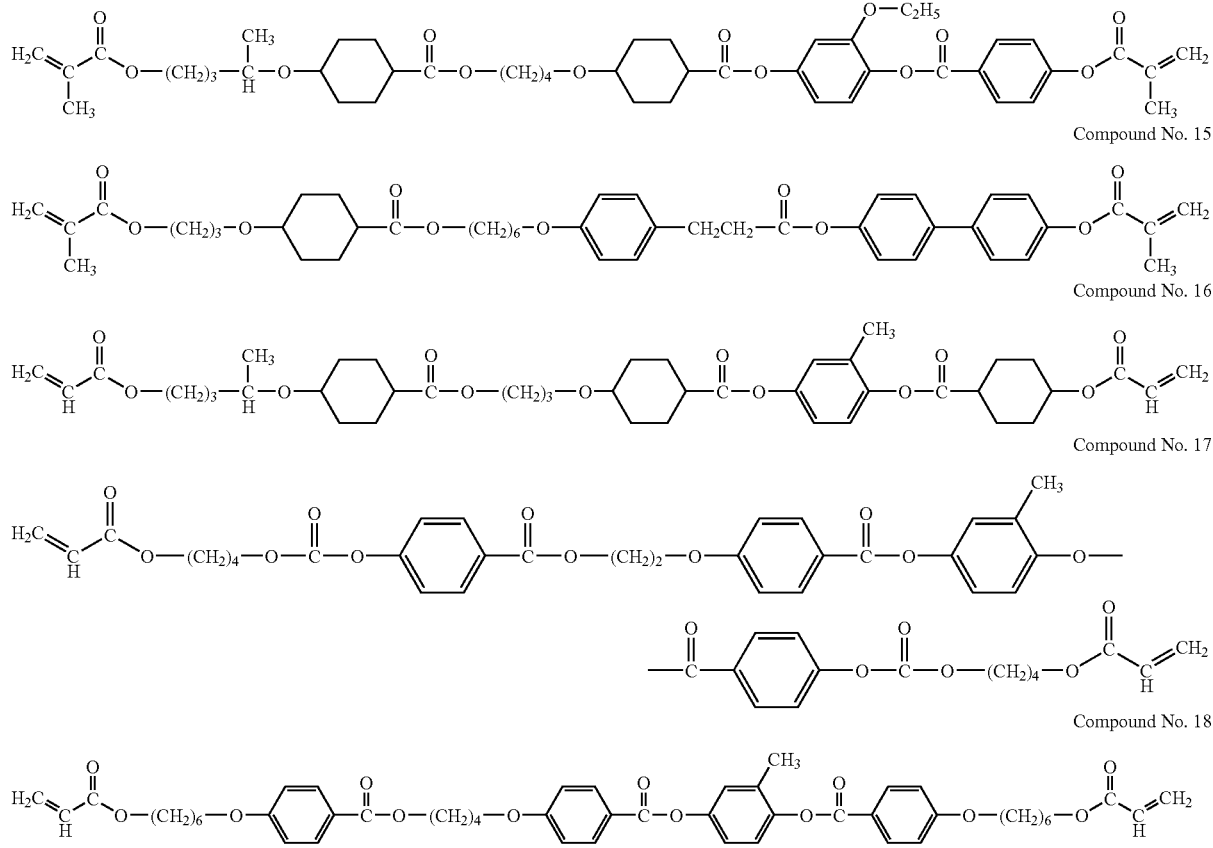

Of the polymerizable compounds according to the invention preferred are those of general formula (1) in which $Y^1$ and $Y^2$ are each —CO—O— or —O—CO— because of their high solvent solubility and those in which at least one of the rings A, B, C, and D is a 2,6-naphthylene ring because of their high optical refractive index anisotropy.

The polymerizable compound of the invention is not restricted by the process of preparation and may be prepared using any known reactions, for example, as follows. A carboxyl-containing phenol or naphthol compound is reacted with a compound containing a hydroxyl-protective group, such as a trimethylsilyl compound, a benzyl ether, or dihydropyran, to form a hydroxyl-protected intermediate. Separately, the hydroxyl group of a phenol or naphthol compound or of an alcohol compound is esterified with a (meth)acrylyl halide to form a (meth)acryloyloxy intermediate. The (meth)acryloyloxy intermediate and the hydroxyl-protected intermediate are caused to react with each other to form an ester linkage as $Y^1$ according to reaction scheme shown in [Chemical Formula 5] below. The hydroxyl-protective group is then removed, and the resulting alcohol compound is allowed to react with a carboxyl-containing (meth)acryloyloxy compound according to reaction scheme shown in [Chemical Formula 5] to form $Y^2$.

Alternatively, the polymerizable composition of the invention containing the polymerizable compound of the invention and a liquid crystal compound can be obtained as follows. In the preparation of a (meth)acryloyloxy liquid crystal compound, the reaction temperature and the (meth)acrylic acid equivalent are adjusted so as to produce a (meth)acryloyloxy intermediate together with a prescribed amount of a dimerized intermediate as in reaction scheme shown in [Chemical Formula 6] below. The carboxyl group of the dimerized intermediate and the hydroxyl group of the above-described alcohol compound are caused to react on each other according to reaction scheme shown in [Chemical Formula 5] to form $Y^2$.

The polymerizable compound obtained through reaction scheme shown in [Chemical Formula 5] is the one in which $Y^1$ or $Y^2$ is —CO—O— or —O—CO—, and the (meth)acryloyloxy group is present in each of $R^7$ and $R^8$.

[Chemical Formula 5]

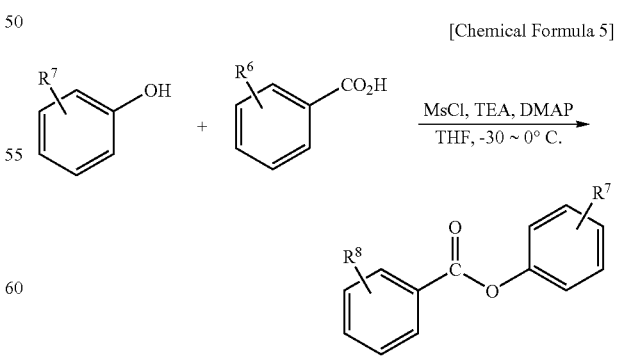

wherein MsCl stands for methanesulfonyl chloride; TEA, triethylamine; DMAP, 4-dimethylaminopyridine; and THF, tetrahydrofuran.

[Chemical Formula 6]

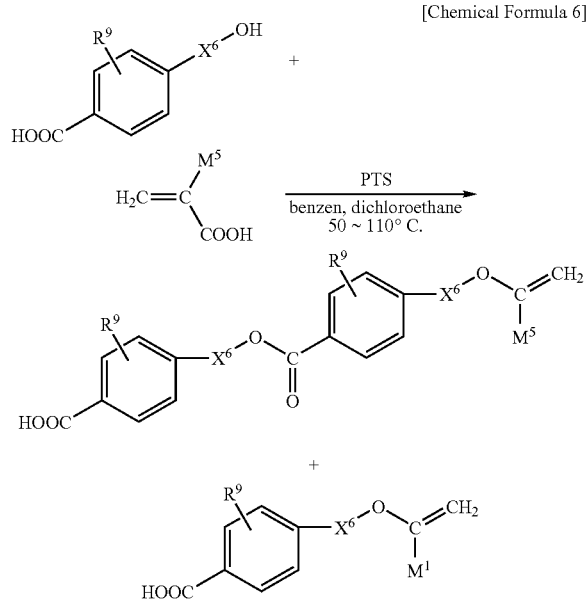

The polymerizable compound of the invention, which is compounded with a liquid crystal material where necessary, is preferably used as an optical material excellent in liquid crystal alignment fixing properties and optical characteristics. It is also useful as a liquid crystal alignment layer, a liquid crystal alignment controlling agent, a coating material, a material to make a protective film, and so forth.

The polymerizable composition of the invention will then be described.

The polymerizable composition of the invention contains the polymerizable compound of the invention and is preferably used as an optical material. The polymerizable composition may contain a liquid crystal compound in addition to the polymerizable compound. As used herein, the term "liquid crystal compound" is intended to include a known liquid crystal compound, a known liquid crystal-like compound, and a mixture thereof.

The liquid crystal compound is preferably a polymerizable liquid crystal compound represented by general formula (2) in view of its superior alignment controllability.

The optionally branched alkylene, alkyleneoxy, and alkyleneoxycarbonyloxy groups represented by $X^3$ and $X^4$ in general formula (2) are exemplified by those respectively recited above for $X^1$ and $X^2$ in general formula (1).

The single bond, the ester linkage, the ether linkage, the optionally branched alkylene group having 2 to 8 carbon atoms which may have an unsaturated bond, and the combination thereof as a linking group as represented by $Y^3$ and $Y^4$ in general formula (2) are exemplified by those recited above for $Y^1$ and $Y^2$ in general formula (1).

Examples of the substituents on the cyclic structures represented by the rings E, F, and G in general formula (2) are the same as those enumerated above with respect to the rings A, B, C, and D.

Examples of the substituents $R^4$, $R^5$, and $R^6$ on the cyclic structures represented by the rings E, F, and G in general formula (2) are the same as those enumerated above with respect to the substituents $R^1$, $R^2$, and $R^3$ on the rings A, B, C, and D in general formula (1).

Specific examples of the liquid crystal compound represented by general formula (2) include, but are not limited to, the compounds shown in [Chemical Formula 7] to [Chemical Formula 12] below.

[Chemical Formula 7]

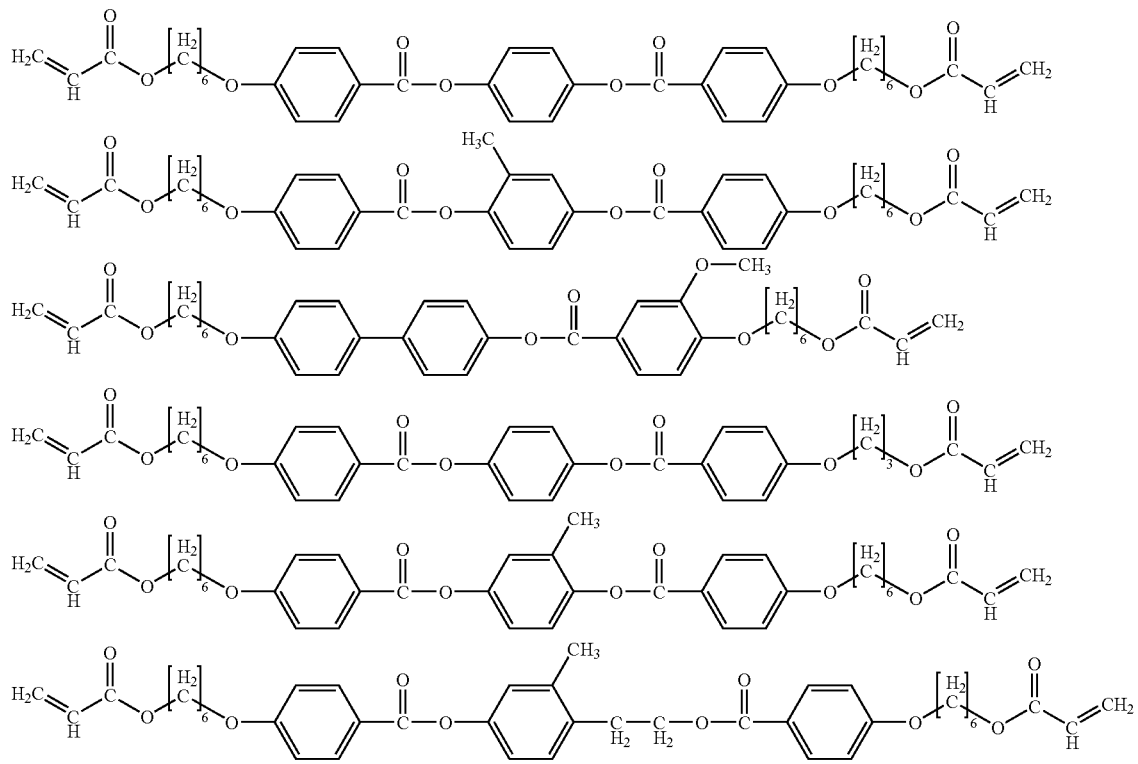

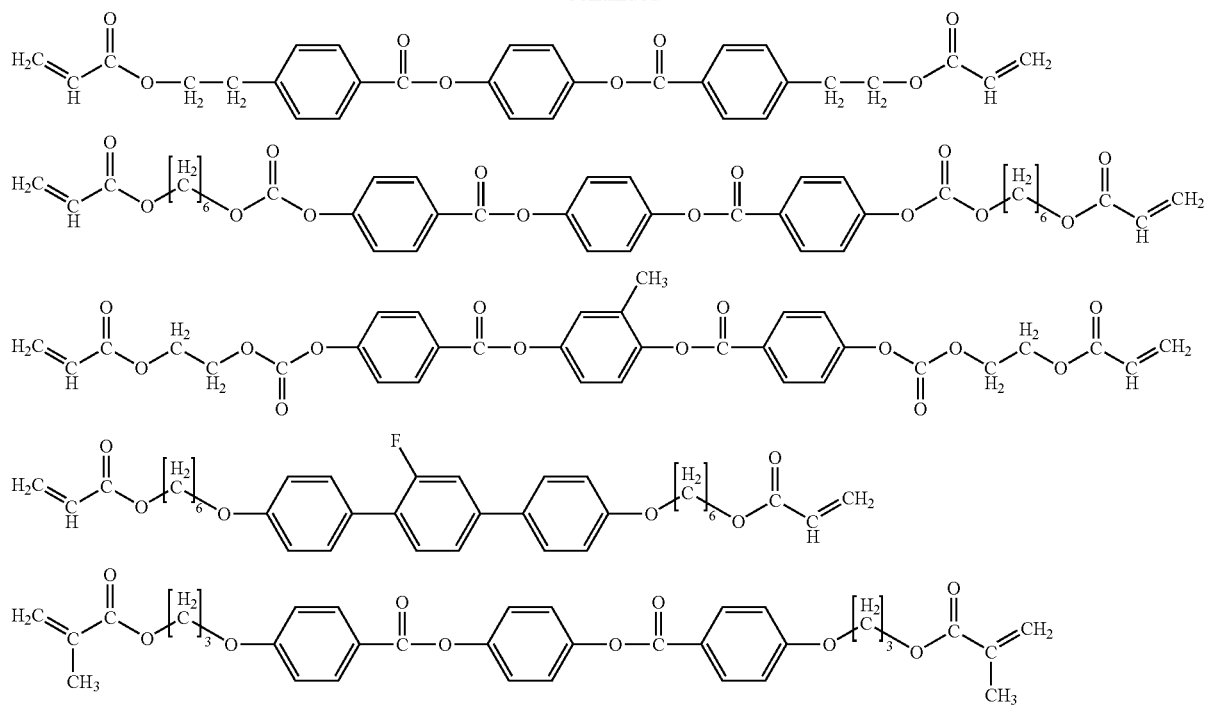
[Chemical Formula 8]
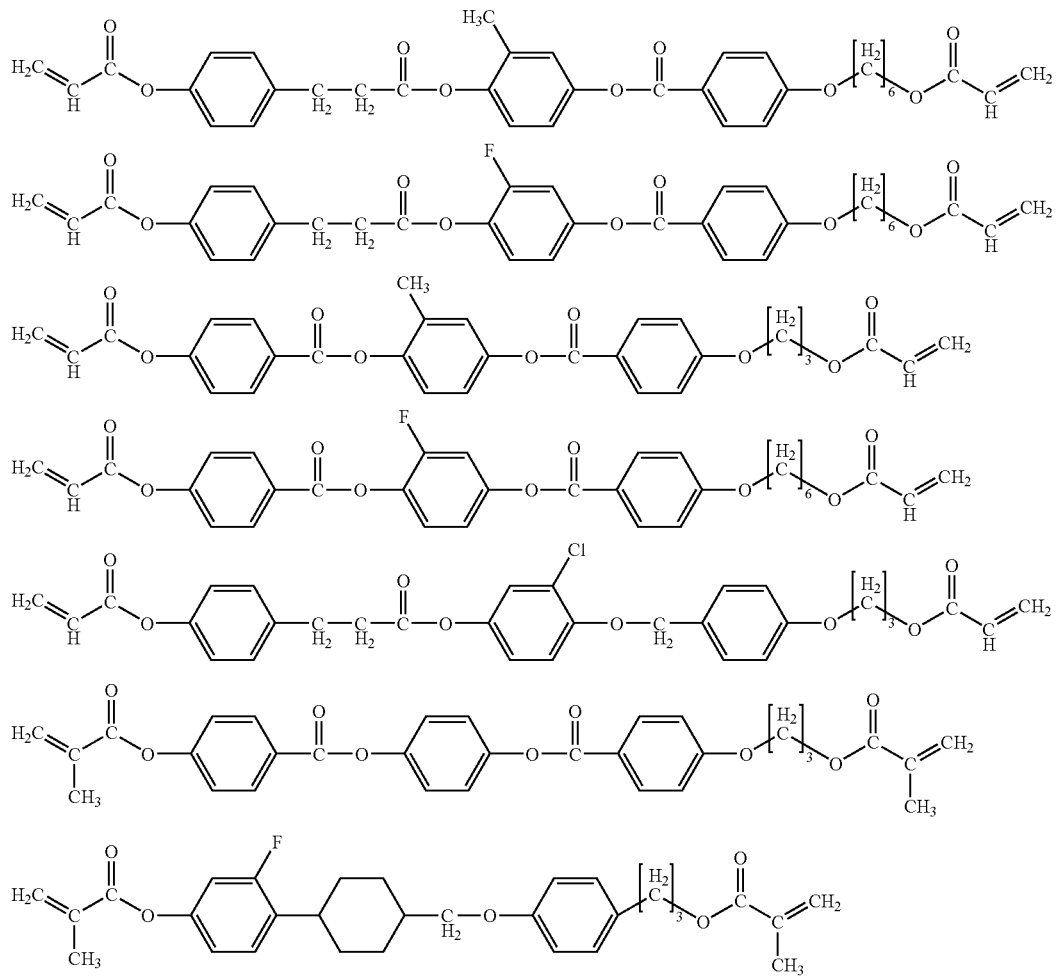

-continued
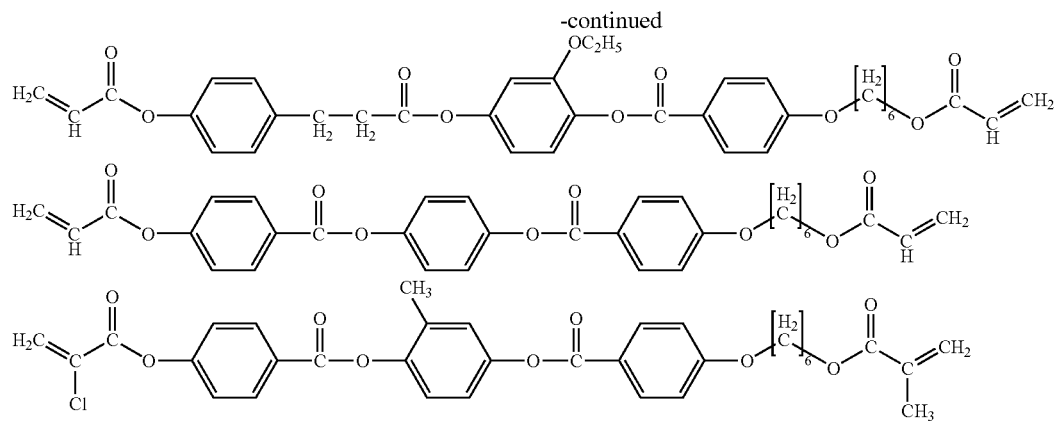
[Chemical Formula 9]
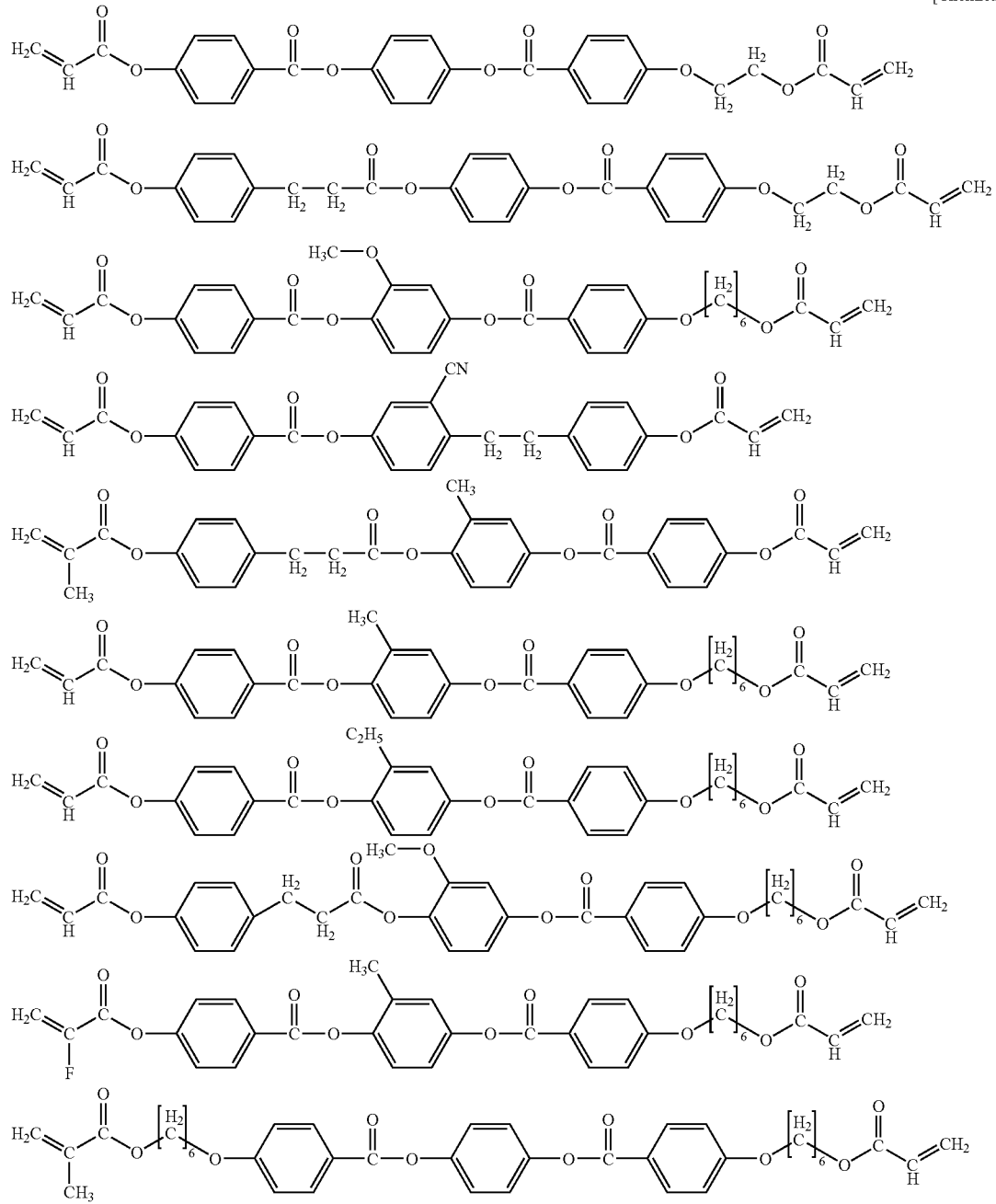

-continued
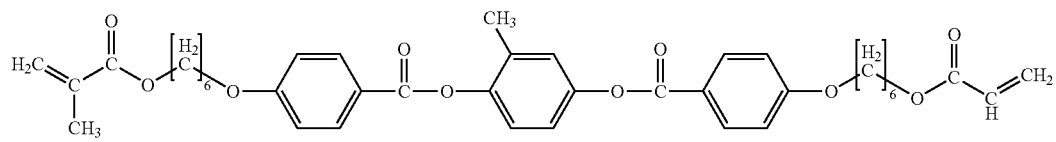
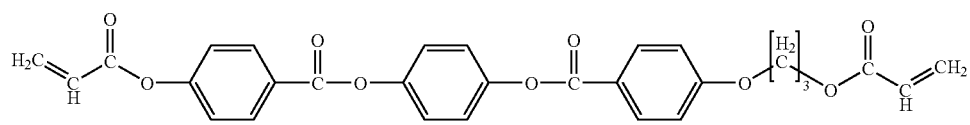
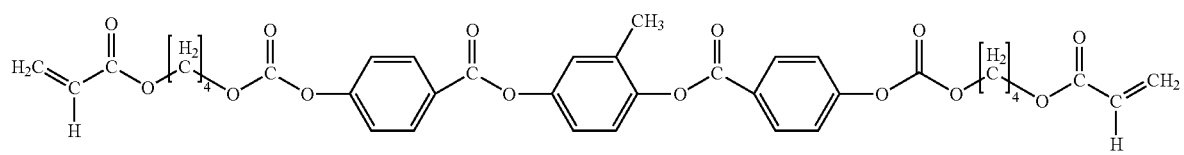
[Chemical Formula 10]
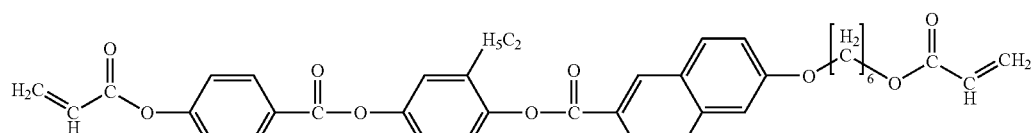
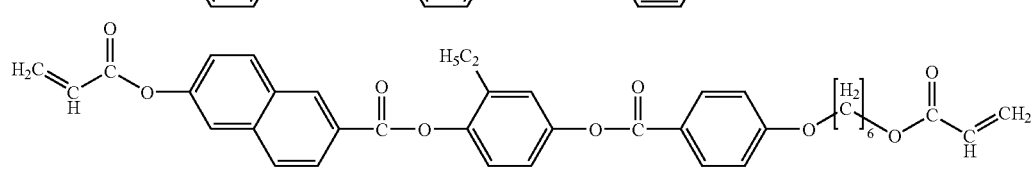
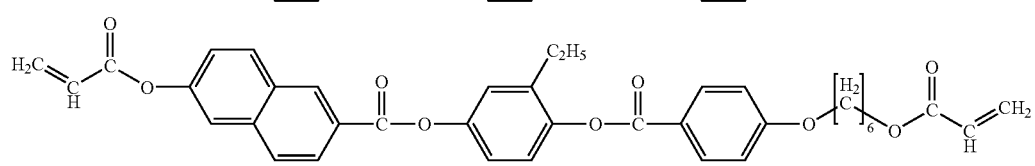
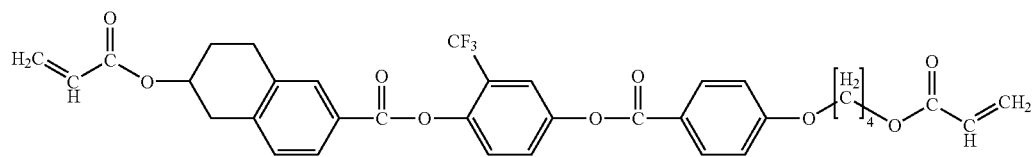
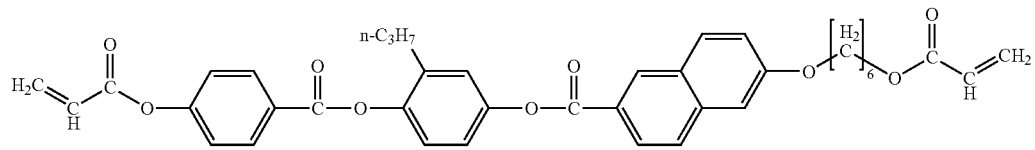
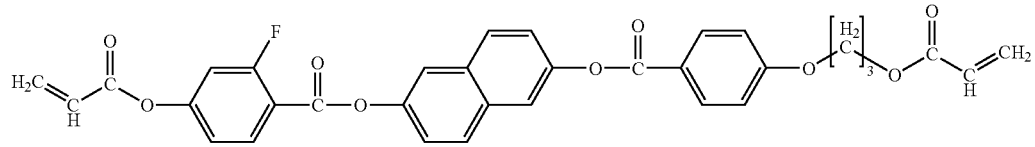
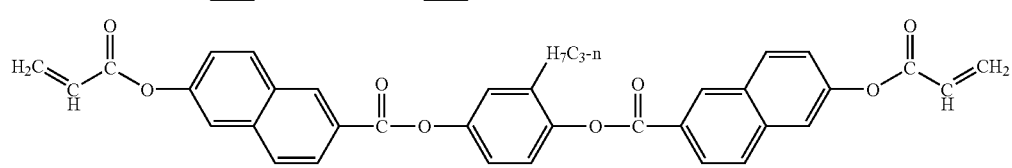
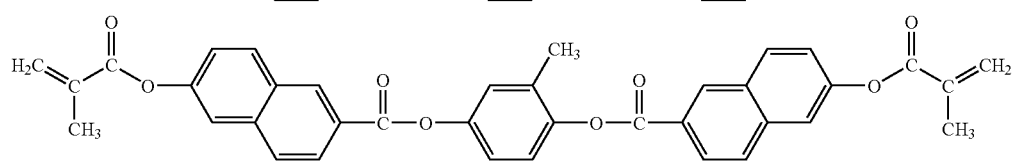

-continued
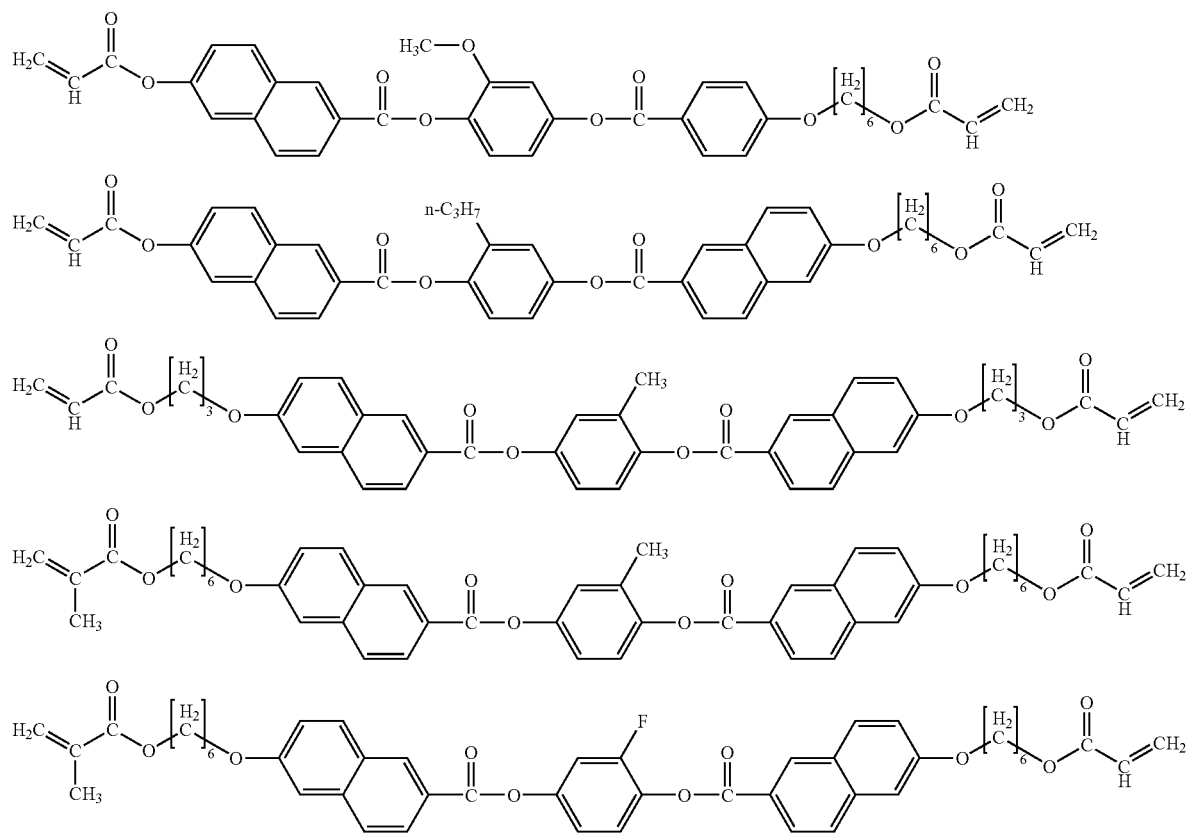
[Chemical Formula 11]
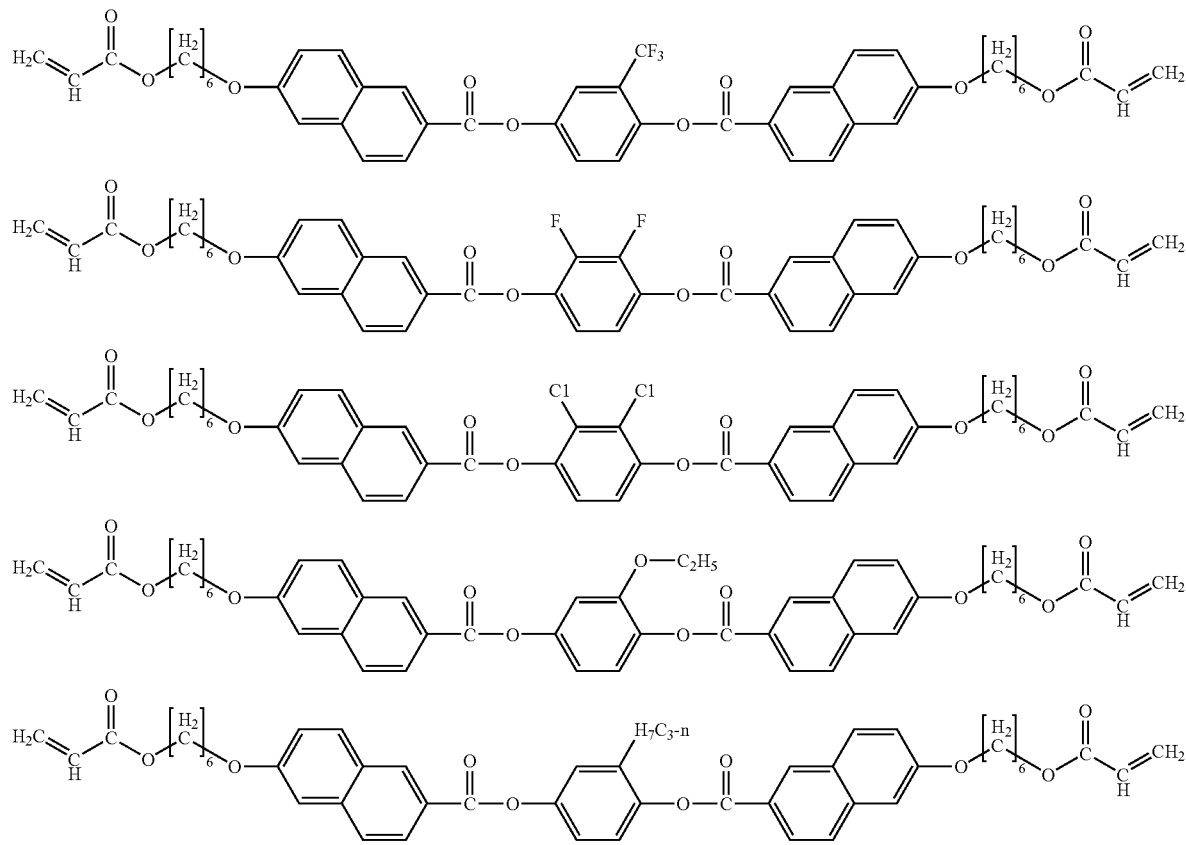

-continued
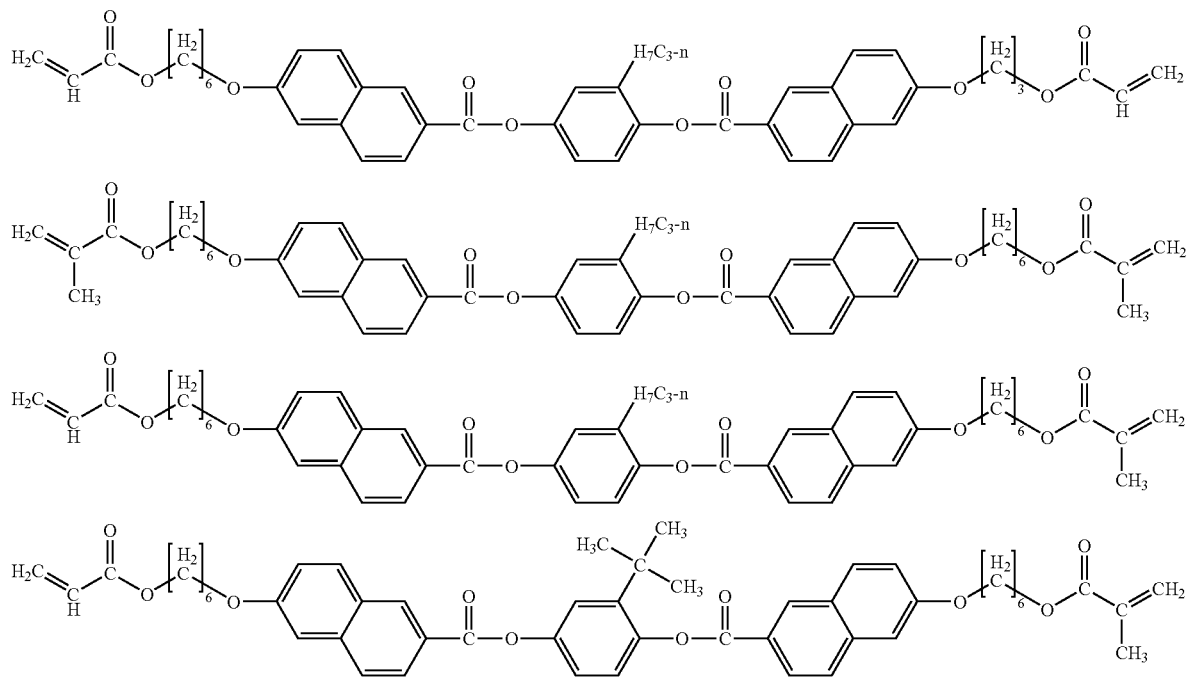
[Chemical Formula 12]
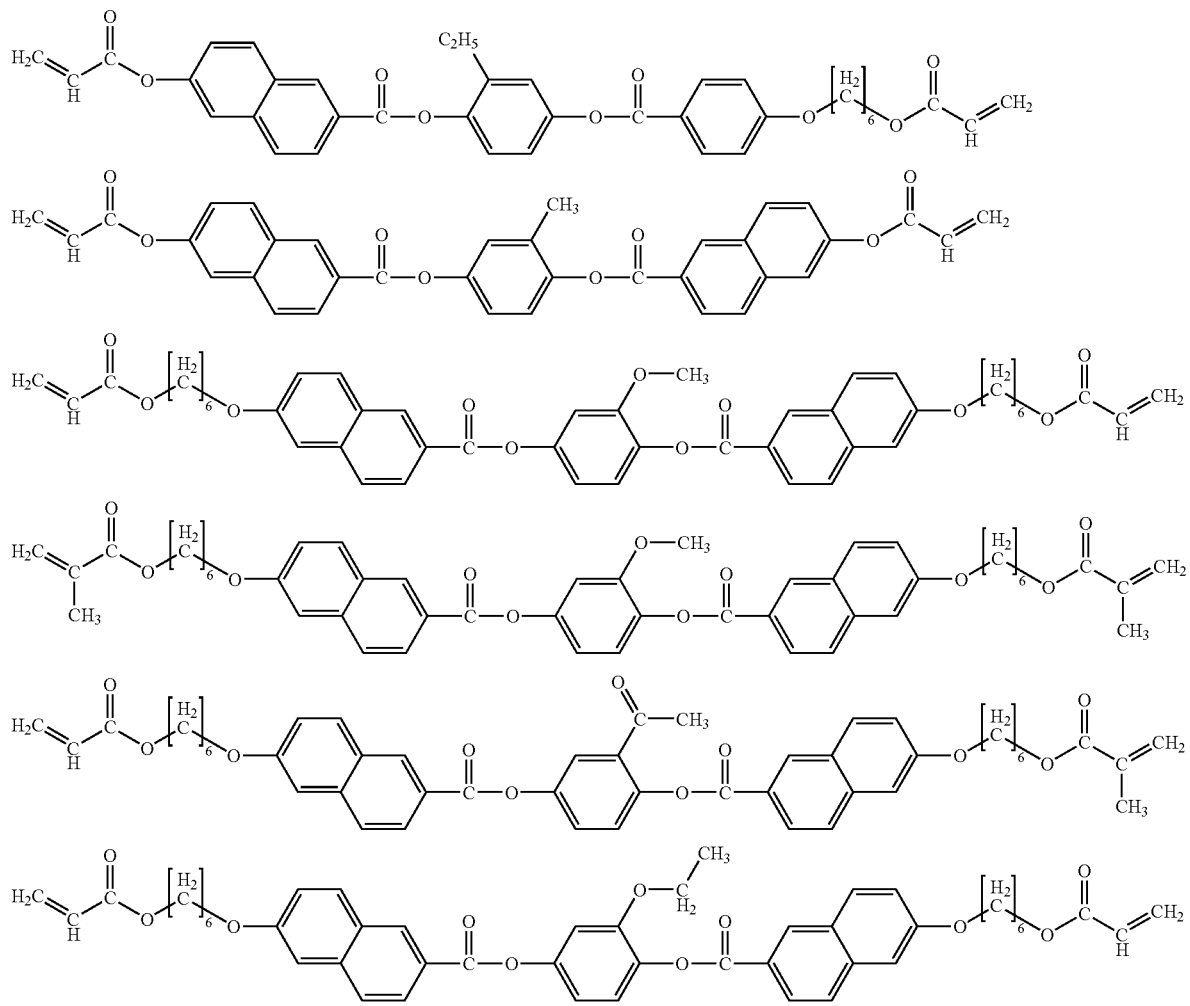

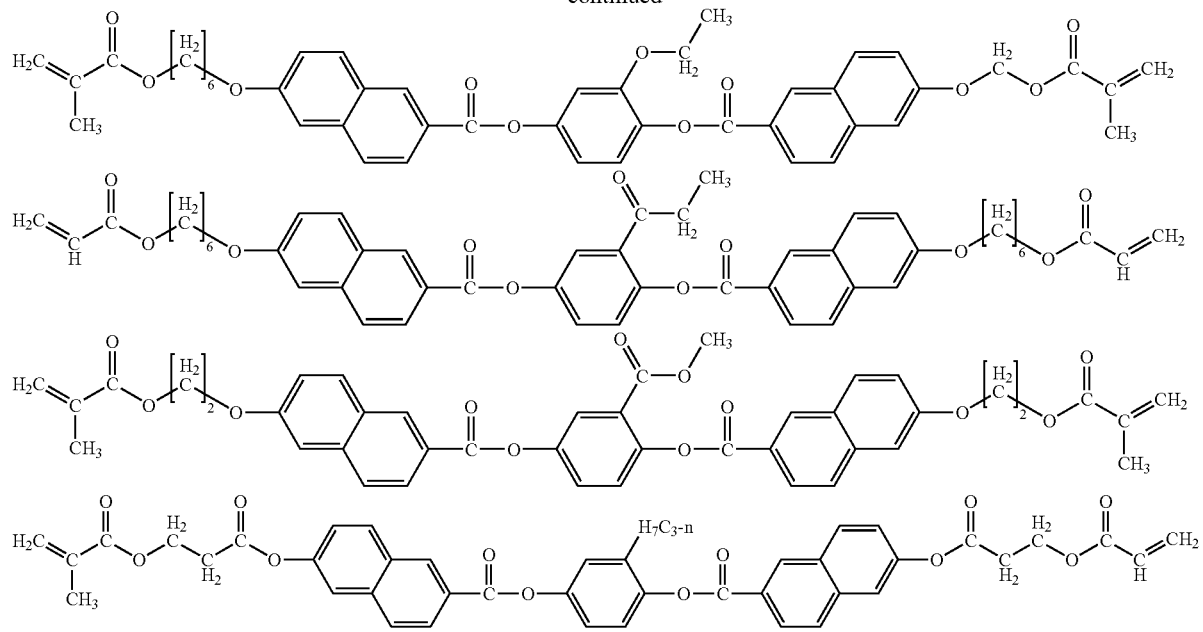

In addition to the above-described liquid crystal compounds, commonly used liquid crystal compounds can be used in the polymerizable composition. Examples of such liquid crystal compounds include, though not exclusively, the following compounds shown in [Chemical Formula 13]. In [Chemical Formula 13] below, $W_1$ represents a hydrogen atom, an optionally branched alkyl group having 1 to 8 carbon atoms, an optionally branched alkoxy group having 1 to 8 carbon atoms, an optionally branched alkenyl group having 2 to 8 carbon atoms, an optionally branched alkenyloxy group having 2 to 8 carbon atoms, an optionally branched alkoxyalkyl group having 2 to 8 carbon atoms, an optionally branched alkanoyloxy group having 2 to 8 carbon atoms, or an optionally branched alkoxycarbonyl group having 2 to 8 carbon atoms; $W_3$ represents a cyano group, a halogen atom, an optionally branched alkyl group having 1 to 8 carbon atoms, an optionally branched alkanoyloxy group having 2 to 8 carbon atoms, or an optionally branched alkoxycarbonyl group having 2 to 8 carbon atoms; and $W_2$ and $W_4$ each represent a hydrogen atom, a halogen atom, or a nitrile group.

[Chemical Formula 13]

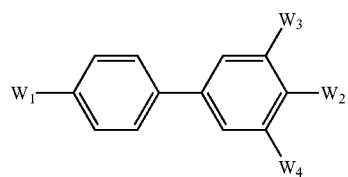

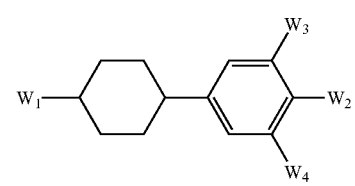

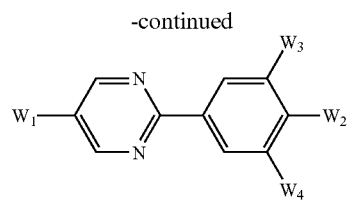

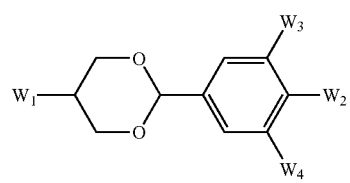

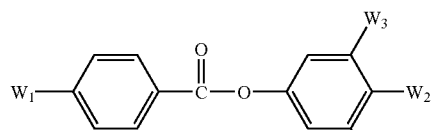

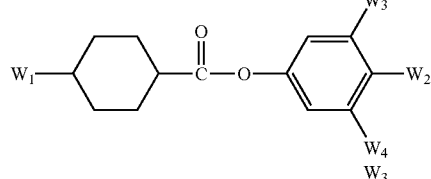

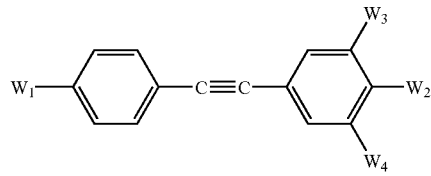

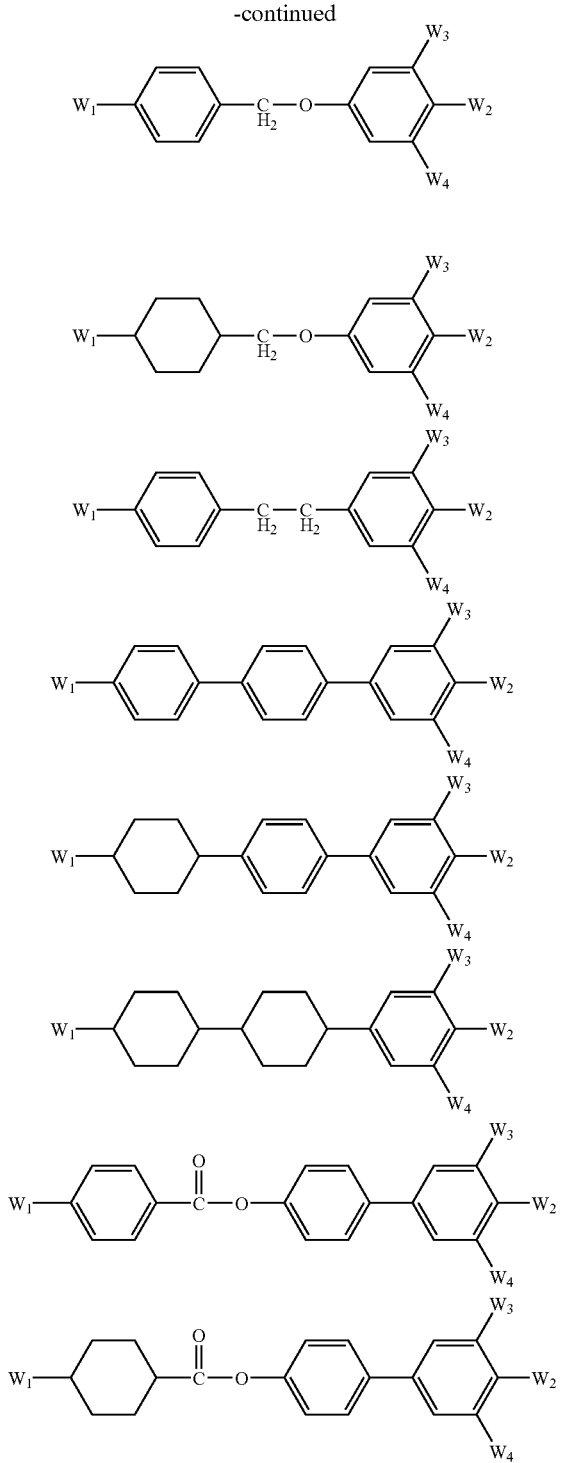
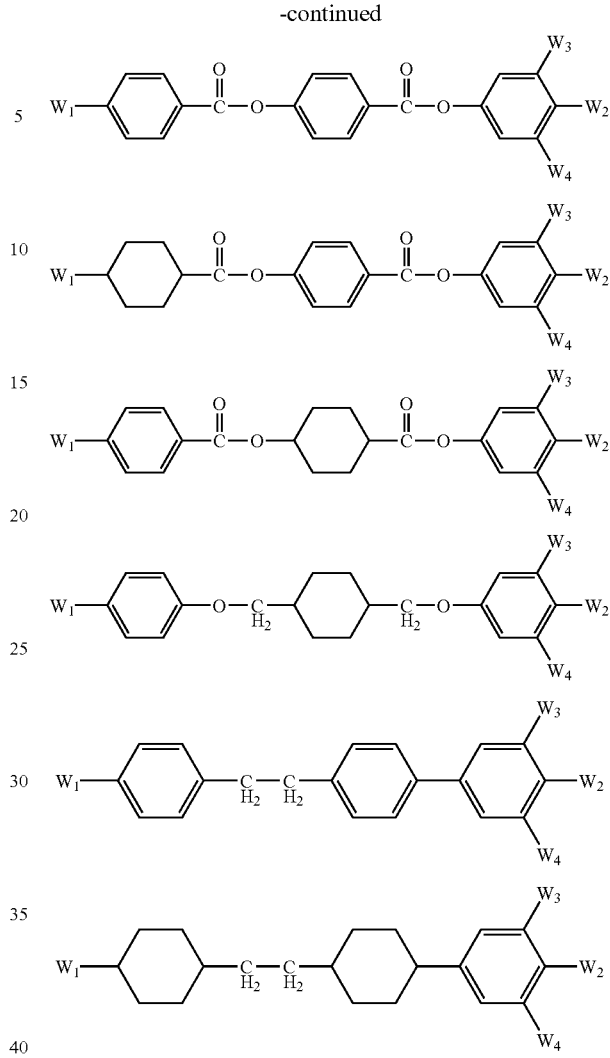

It is preferred that the liquid crystal compound to be used in the polymerizable composition have a polymerizable functional group. Examples of the polymerizable functional group include a (meth)acryloyloxy group, a fluoroacrylic group, a chloroacrylic group, a tritluoromethylacrylic group, an oxirane ring (epoxy group), an oxetane ring, a styrene compound (styryl group), a vinyl group, a vinyl ether group, a vinyl ketone group, a maleimide group, or a phenylmaleimide group. Any commonly used liquid crystal compounds having such a polymerizable functional group can be used. Examples of such compounds include, but are not limited to, those described in JP 2005-15473A, paras. [0172] through [0314] and compounds shown in [Chemical Formula 14] to [Chemical Formula 19] below.

[Chemical Formula 14]

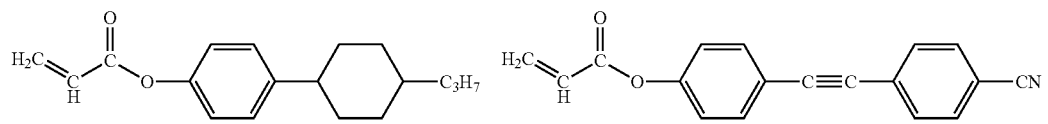

-continued
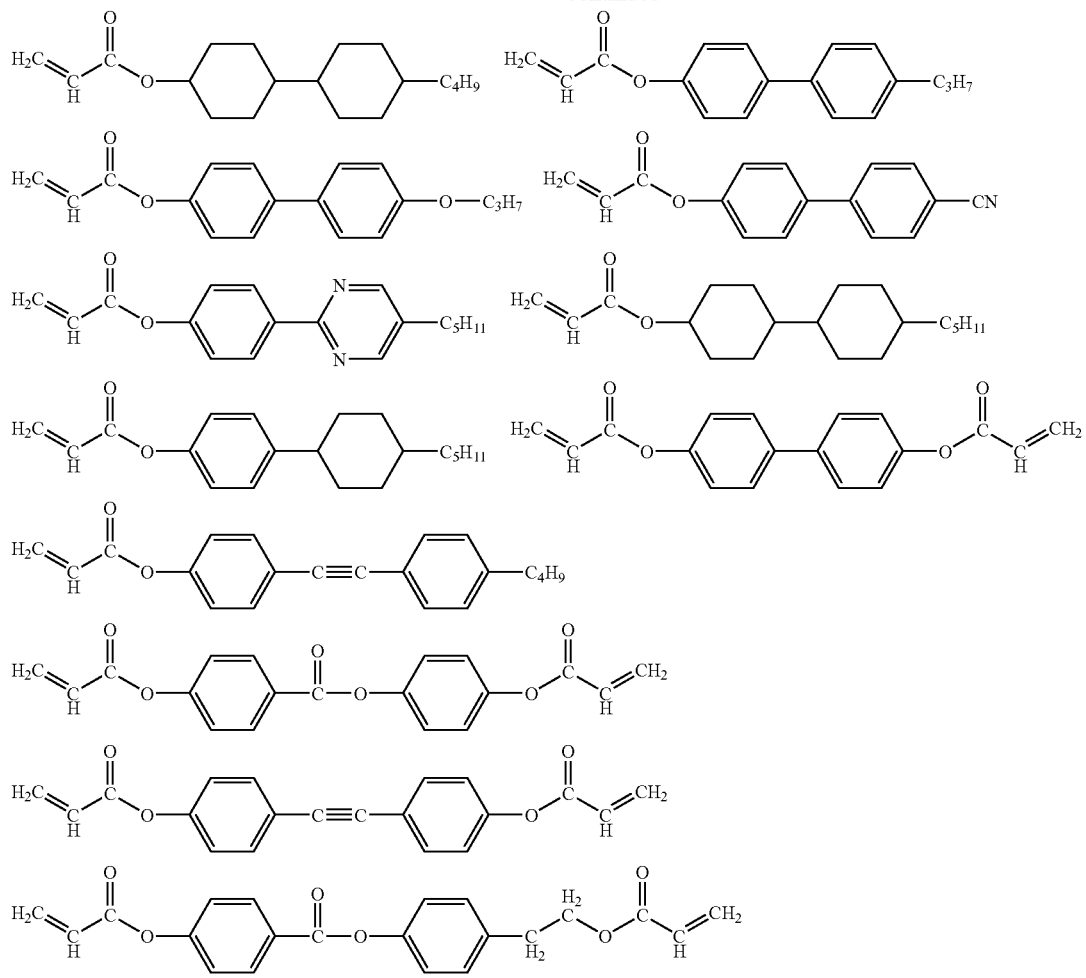
[Chemical Formula 15]
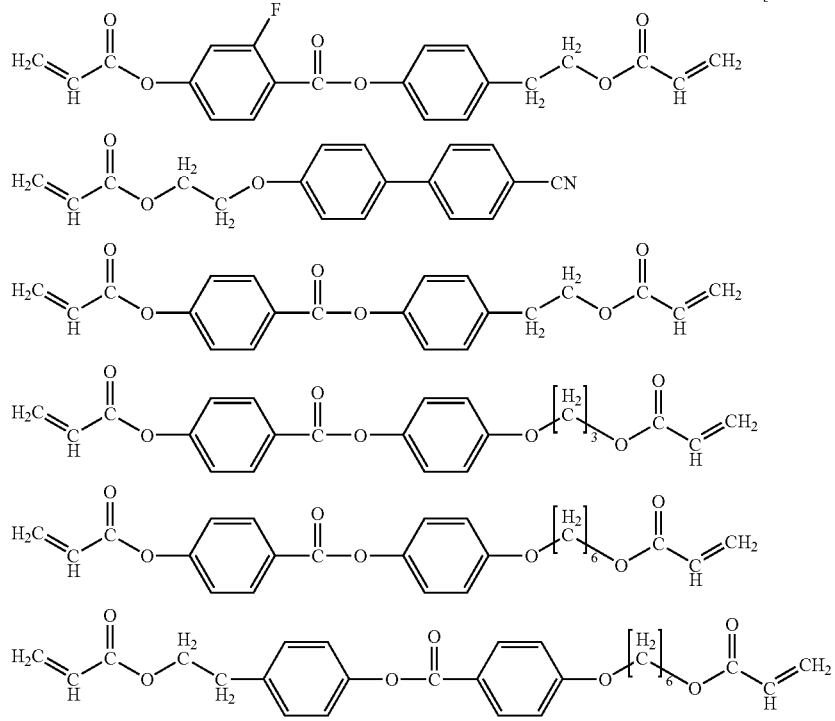

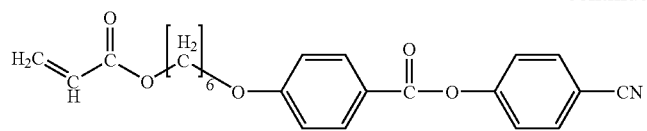
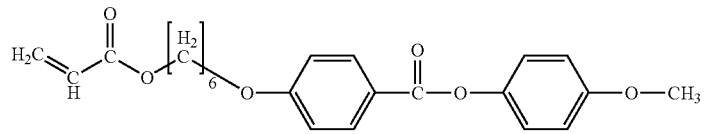
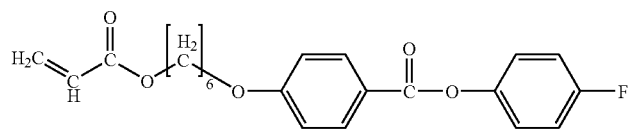
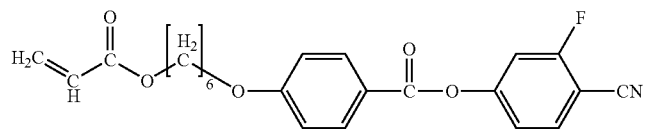
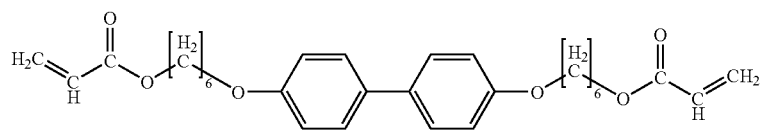
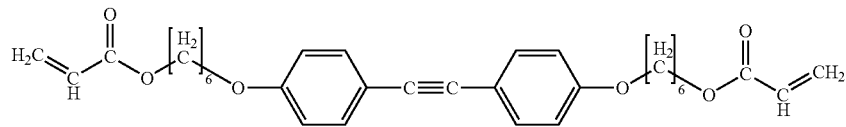
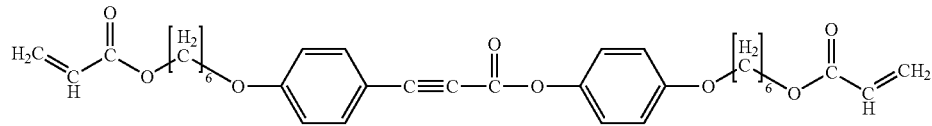
[Chemical Formula 16]
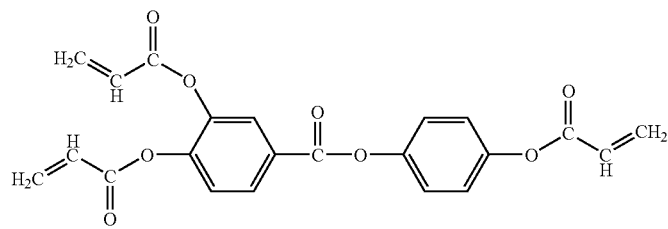
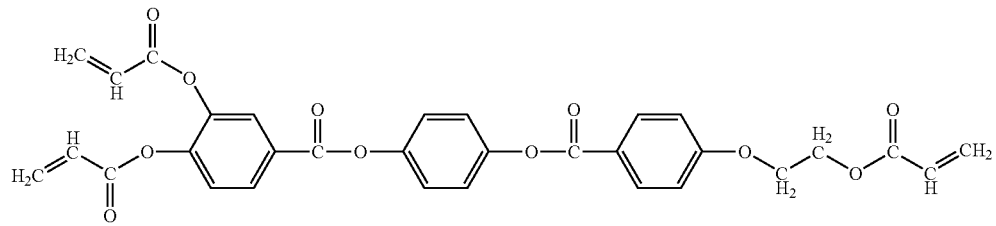
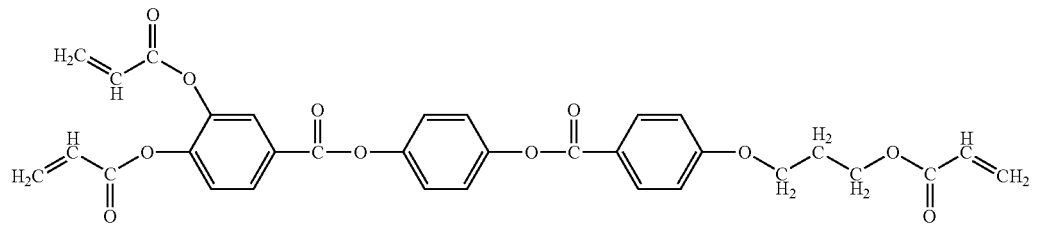

-continued
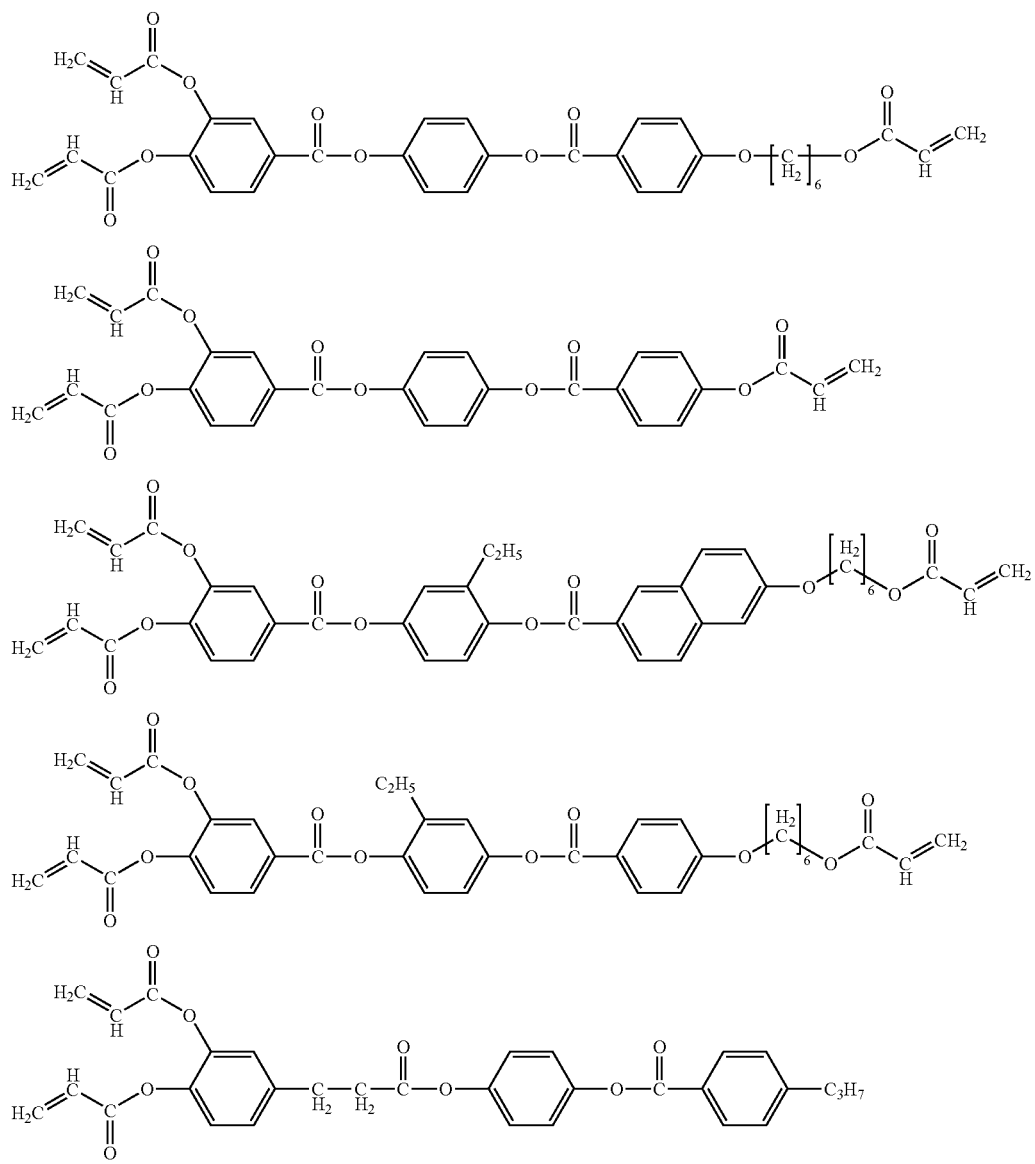
[Chemical Formula 17]
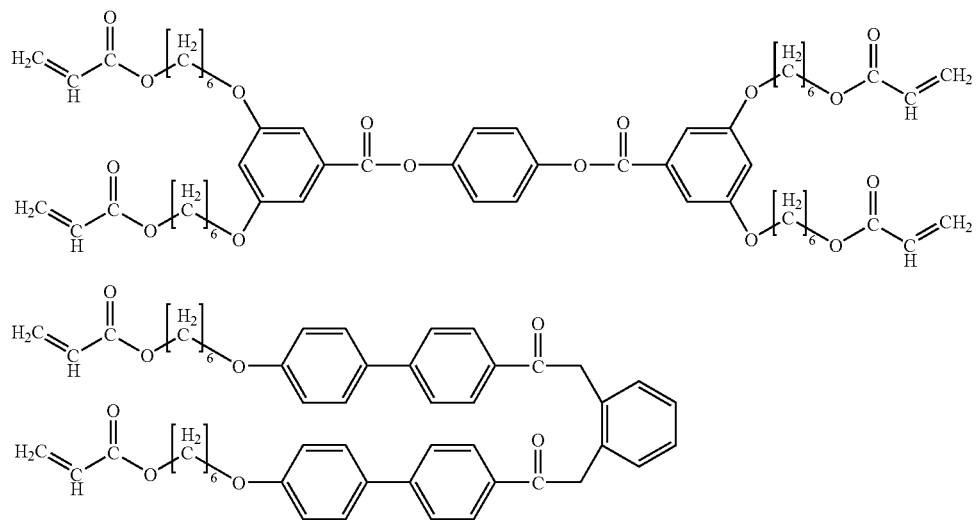

-continued
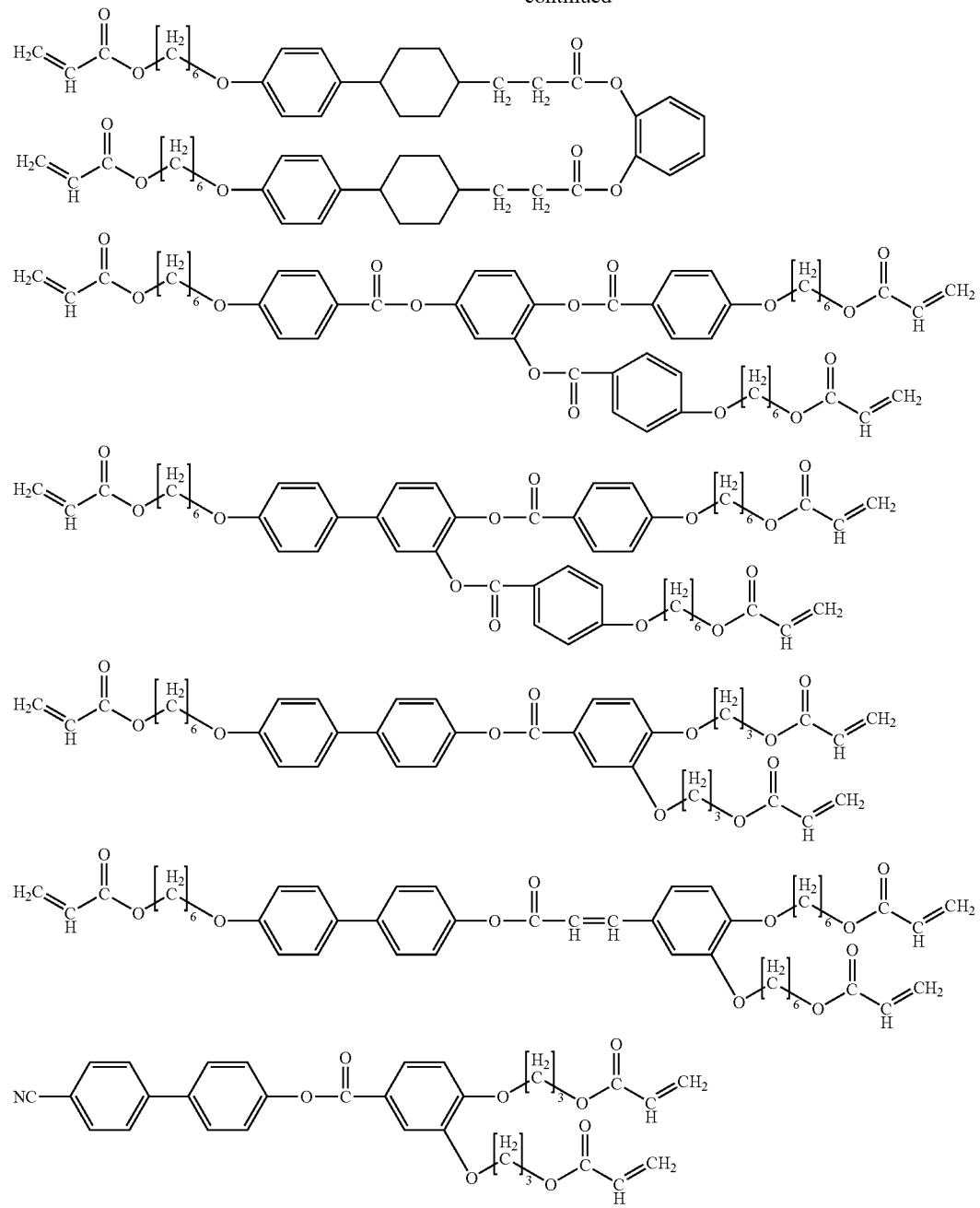
[Chemical Formula 18]
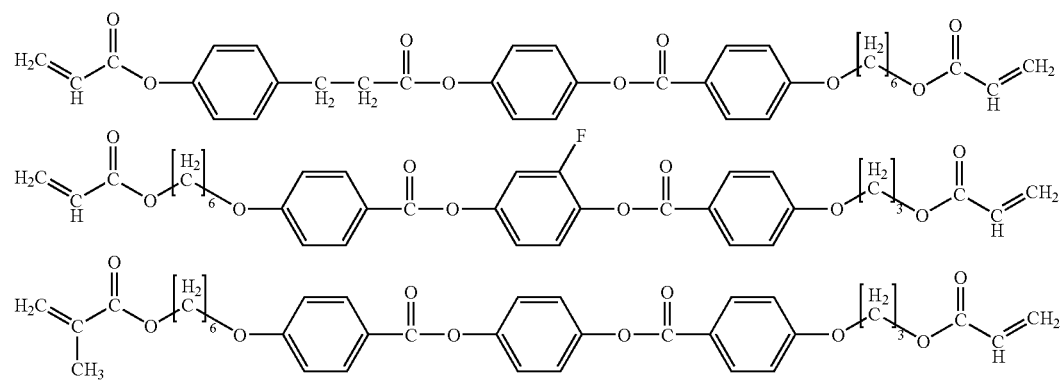

-continued
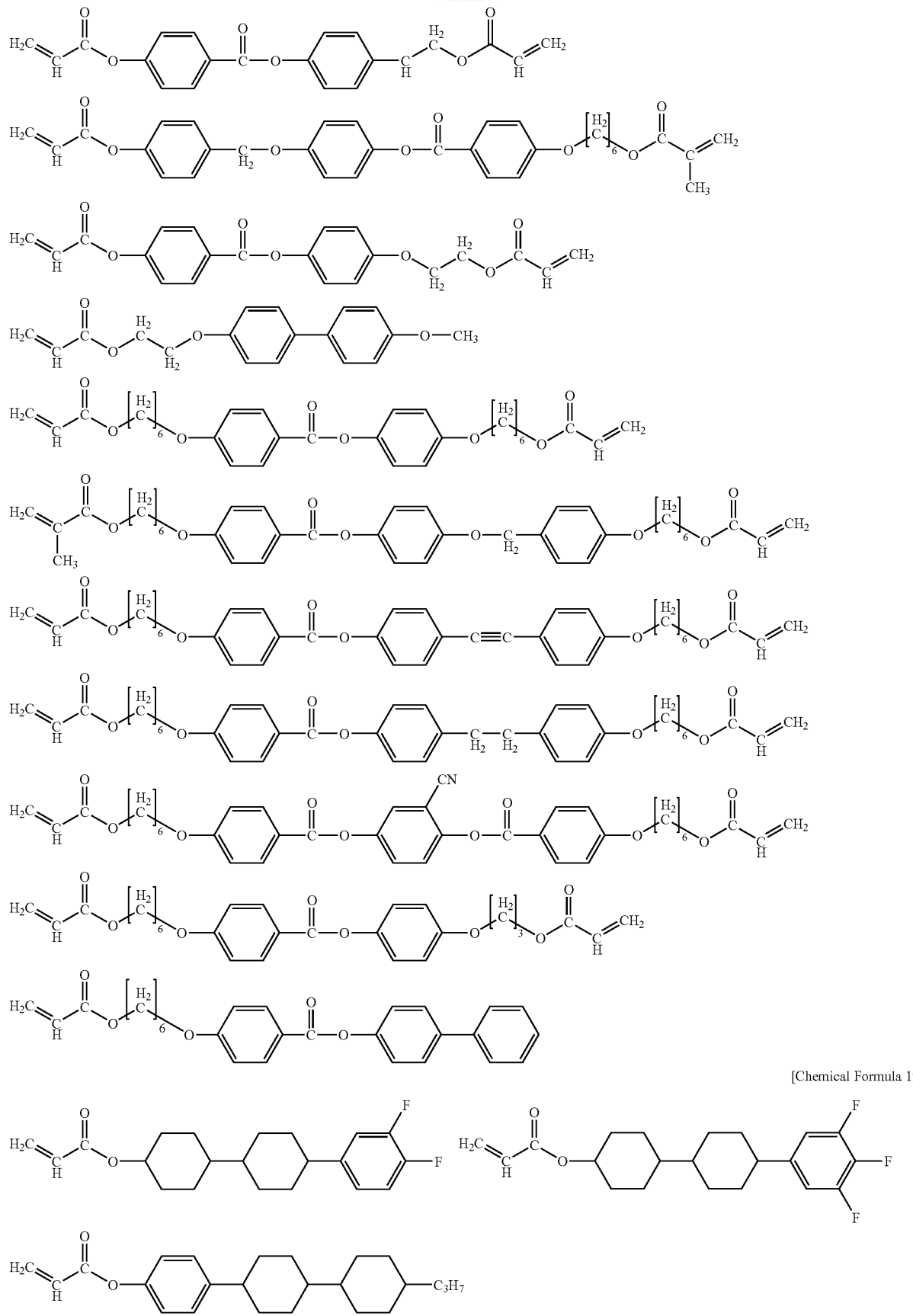
[Chemical Formula 19]

-continued

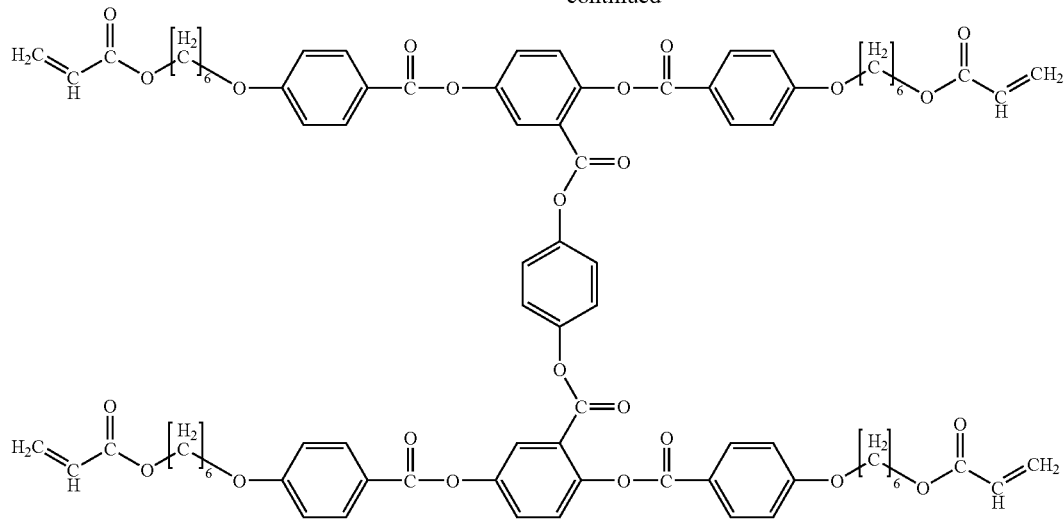

Taking the sum of the polymerizable compound of the invention and the liquid crystal compound as 100 parts by mass, it is preferred that the ratio of the polymerizable compound of general formula (1) be in the range of from 1 to 30 parts, more preferably 3 to 20 parts. Less than 1 part by mass of the polymerizable compound of the invention may fail to produce the intended effects. A polymerizable composition containing more than 30 parts by mass of the polymerizable compound of the invention tends to encounter with difficulty in alignment control or film thickness control.

Where, in particular, improved compatibility to the other liquid crystal compound is desired, it is preferred to use the polymerizable compound of the invention in a high compounding ratio, specifically in an amount of 3 to 20 parts by mass. Where, in particular, improved uniformity of alignment is desired, the amount of the liquid crystal compound is preferably adjusted so that the ratio of the polymerizable compound of the invention may be from 3 to 20 parts by mass.

The polymerizable composition of the invention may be formulated into a solution in a solvent, where necessary, with other monomer (a compound having an ethylenically unsaturated bond) and a radical polymerization initiator.

Examples of the other monomers include (meth)acrylic esters, such as methyl (meth)acrylate, ethyl (meth)acrylate, propyl (meth)acrylate, butyl (meth)acrylate, sec-butyl (meth)acrylate, tert-butyl (meth)acrylate, hexyl (meth)acrylate, 2-ethylhexyl (meth)acrylate, tetrahydrofurfuryl (meth)acrylate, glycidyl (meth)acrylate, allyl (meth)acrylate, allyloxy (meth)acrylate, cyclohexyl (meth)acrylate, benzyl (meth)acrylate, 1-phenylethyl (meth)acrylate, 2-phenylethyl (meth)acrylate, furfuryl (meth)acrylate, diphenylmethyl (meth)acrylate, naphthyl (meth)acrylate, pentachlorophenyl (meth)acrylate, 2-chloroethyl (meth)acrylate, methyl α-chloro (meth)acrylate, phenyl α-bromo(meth)acrylate, trifluoroethyl (meth)acrylate, tetrafluoropropyl (meth)acrylate, polyethylene glycol di(meth)acrylate, 1,4-butanediol di(meth)acrylate, 1,6-hexanediol di(meth)acrylate, trimethylolpropane tri(meth)acrylate, pentaerythritol tri(meth)acrylate, pentaerythritol tetra(meth)acrylate, dipentaerythritol penta(meth)acrylate, and dipentaerythritol hexa(meth)acrylate; diacetoneacrylamide, styrene, vinyltoluene, and divinylbenzene.

The monomers described above may be used in any ratio as long as the resulting polymer may enjoy the effects on alignment control and optical characteristics. In order to secure these effects, the content of the other monomer is preferably not more than 50 parts by mass, more preferably 30 parts by mass or less, per 100 parts by mass of the sum of the polymerizable compound and the liquid crystal compound of the invention.

Examples of the radical polymerization initiator include benzoyl peroxide, 2,2'-azobisisobutyronitrile, benzoin ethers, benzophenones, acetophenones, benzyl ketals, diaryl iodonium salts, triaryl sulfonium salts, diphenyl iodonium tetrafluoroborate, diphenyl iodonium hexafluorophosphonate, diphenyl iodonium hexafluoroarsenate, diphenyliodonium tetra(pentafluorophenyl)borate, 4-methoxyphenyl phenyl iodonium tetrafluoroborate, 4-methoxyphenyl phenyl iodonium hexafluorophosphonate, 4-methoxyphenyl phenyl iodonium hexafluoroarsenate, bis(4-tert-butylphenyl) iodonium diphenyl iodonium tetrafluoroborate, bis(4-tert-butylphenyl) iodonium diphenyl iodonium hexafluoroarsenate, bis(4-tert-butylphenyl) iodonium diphenyl iodonium trifluoromethanesulfonate, triphenyl sulfonium hexafluorophosphonate, triphenyl sulfonium hexafluoroarsenate, triphenyl sulfonium tetra(pentafluorophenyl)borate, 4-methoxyphenyl diphenyl sulfonium tetrafluoroborate, 4-methoxyphenyl diphenyl sulfonium hexafluorophosphonate, 4-methoxyphenyl diphenyl sulfonium hexafluoroarsenate, 4-methoxyphenyl diphenyl sulfonium trifluoromethanesulfonate, 4-methoxyphenyl diphenyl sulfonium triphenyl sulfonium tetra (pentafluorophenyl)borate, 4-phenylthiophenyl diphenyl sulfonium tetrafluoroborate, 4-phenylthiophenyl diphenyl sulfonium hexafluorophosphonate, 4-phenylthiophenyl diphenyl sulfonium hexafluoroarsenate, p-methoxyphenyl-2, 4-bis(trichloromethyl)-s-triazine, 2-(p-butoxystyryl)-s-triazine, 2-(p-butoxystyryl)-5-trichloromethyl-1,3,4-oxadiazole, 9-phenylacridine, 9,10-dimethylbenzphenazine, benzophenone/Michler's ketone, hexaarylbiimidazole/mercaptobenzimidazole, benzyl dimethyl ketal, thioxanthone/amine, triarylsulfonium hexafluorophosphates, and bis(2,4,6-trimethylbenzoyl)phenylphosphine oxide.

A combination of the radical polymerization initiator and a sensitizer is also preferred. Examples of useful sensitizers are thioxanthone, phenothiazine, chlorothioxanthone, xanthone, anthracene, dipyhenylanthracene, and rubrene. If the radical polymerization initiator and/or the sensitizer are added, each amount is preferably 10 parts or less, more preferably 5 parts or less, even more preferably 0.1 to 3 parts, by mass per 100 parts by mass of the sum of the polymerizable compound of the invention and the liquid crystal compound.

Examples of the solvent include benzene, toluene, xylene, mesitylene, n-butylbenzene, diethylbenzene, tetralin, methoxybenzene, 1,2-dimethoxybenzene, ethylene glycol dimethyl ether, diethylene glycol dimethyl ether, acetone, methyl ethyl ketone, methyl isobutyl ketone, cyclopentanone, cyclohexanone, ethyl acetate, methyl lactate, ethyl lactate, ethylene glycol monomethyl ether acetate, propylene glycol monomethyl ether acetate, propylene glycol monoethyl ether acetate, γ-butyrolactone, 2-pyrrolidone, N-methyl-2-pyrrolidone, dimethylformamide, chloroform, dichloromethane, carbon tetrachloride, dichloroethane, trichloroethylene, tetrachloroethylene, chlorobenzene, t-butyl alcohol, diacetone alcohol, glycerol, monoacetylene, ethylene glycol, triethylene glycol, hexylene glycol, ethylene glycol monomethyl ether, ethyl cellosolve, and butyl cellosolve. The solvent may be a single compound or a mixture of compounds. A solvent having a boiling point of 60° to 250° C., particularly a solvent having a boiling point of 60° to 180° C. is preferred. A solvent whose boiling point is lower than 60° C. is liable to vaporize during application, resulting in thickness unevenness. A solvent whose boiling point is higher than 250° C. tends to remain even after solvent removal under reduced pressure or induce thermal polymerization when treated in high temperature, resulting in reduced aligning properties.

The polymerizable composition may further contain an optically active compound to control the selective reflection wavelength range and compatibility with liquid crystals. The amount of the optically active compound, if added, is preferably 0.1 to 100 parts, more preferably 1 to 50 parts, by mass per 100 parts by mass of the sum of the polymerizable compound of the invention and the liquid crystal compound. Examples of usable optically active compounds are shown in [Chemical Formula 20] to [Chemical Formula 38] below.

[Chemical Formula 20]

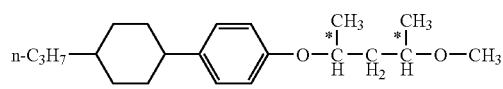

[Chemical Formula 21]

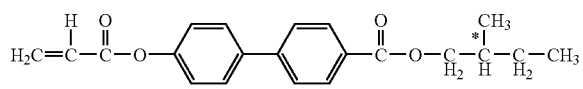

[Chemical Formula 22]

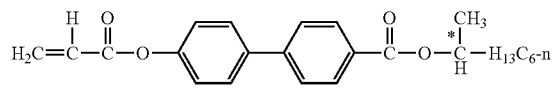

[Chemical Formula 23]

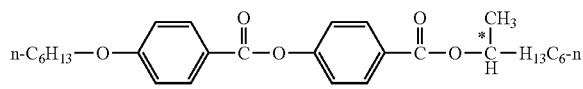

[Chemical Formula 24]

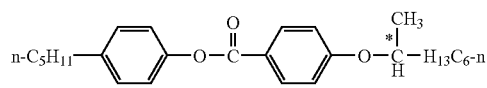

[Chemical Formula 25]

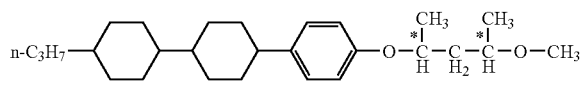

[Chemical Formula 26]

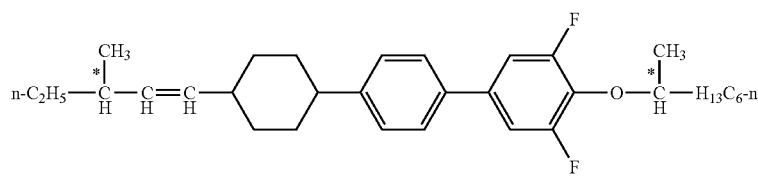

[Chemical Formula 27]

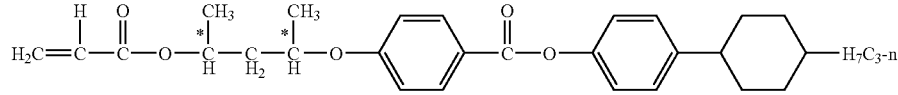

[Chemical Formula 28]

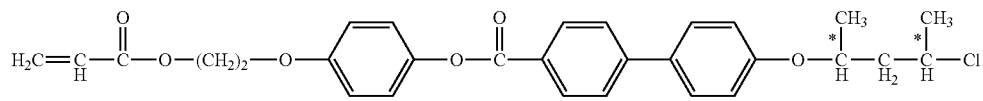

[Chemical Formula 29]

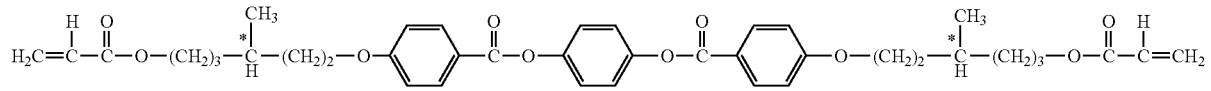

[Chemical Formula 30]

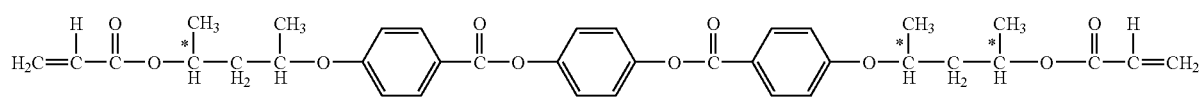

[Chemical Formula 31]

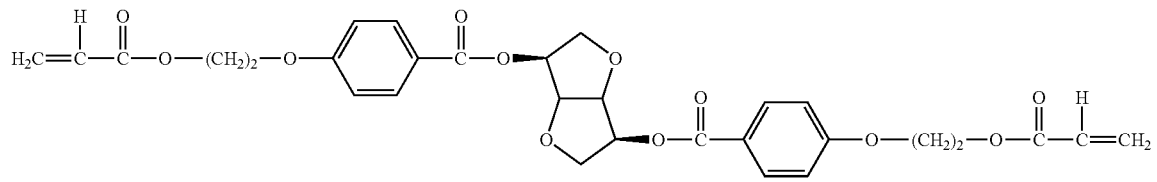

-continued

[Chemical Formula 32]

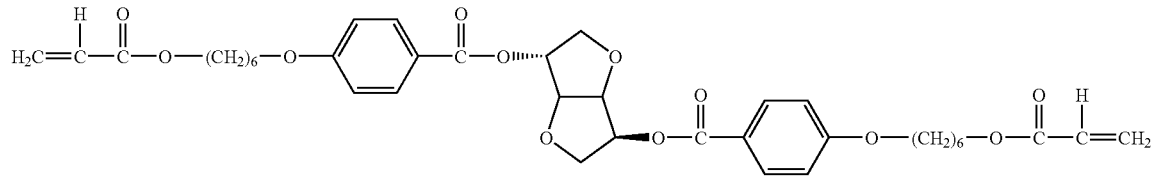

[Chemical Formula 33]

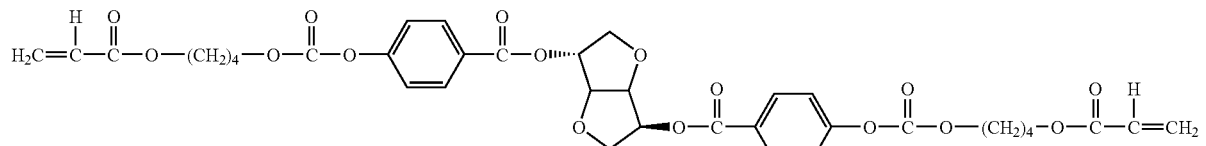

[Chemical Formula 34]

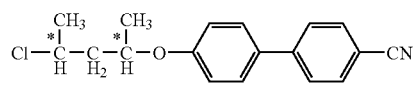

[Chemical Formula 35]

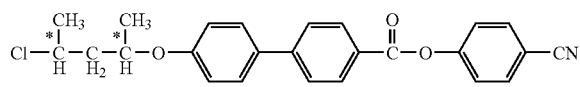

[Chemical Formula 36]

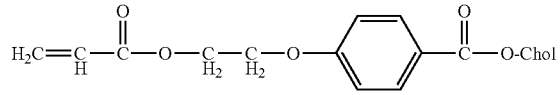

Chol: Cholesteryl group of formula:

[Chemical Formula 37]

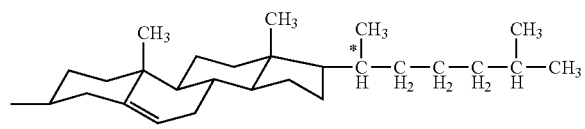

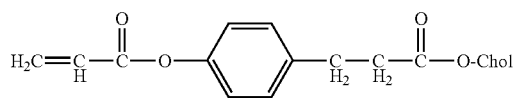

Chol: The same cholesteryl group as shown above.

[Chemical Formula 38]

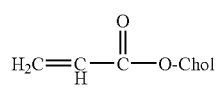

Chol: The same cholesteryl group as shown above.

The polymerizable composition may further contain a surfactant that produces an excluded volume effect over the interface with air. The surfactant is preferably selected from those effective in facilitating applying the polymerizable composition to a substrate or controlling the alignment of the liquid crystal phase. Such surfactants include quaternary ammonium salts, alkylamine oxides, polyamine derivatives, polyoxyethylene-polyoxypropylene condensates, polyethylene glycol and esters thereof, sodium laurylsulfate, ammonium laurylsulfate, amine laurylsulfates, alkyl-substituted aromatic sulfonates, alkylphosphates, perfluoroalkylsulfonates, perfluoroalkylcarboxylates, perfluoroalkyl ethylene oxide adducts, and perfluoroalkyltrimethylammonium salts. A preferred amount of the surfactant to be used depends on the kind of the surfactant, the compounding ratio of the composition, and the like but preferably ranges from 0.01 to 5 parts, more preferably from 0.05 to 1 part, by mass per 100 parts by mass of the sum of the polymerizable compound of the invention and the liquid crystal compound.

Additives may be further added to the polymerizable composition where needed to improve characteristics of the polymerizable composition, including functional compounds, such as storage stabilizers, antioxidants, ultraviolet absorbers, infrared absorbers, fine particles of organic, inorganic or other materials, and polymers.

The storage stabilizers serve to improve storage stability of the polymerizable composition, including hydroquinone, hydroquinone monoalkyl ethers, tert-butyl catechols, pyrogallols, thiophenols, nitro compounds, 2-naphtylamines, and 2-hydroxynaphthalenes. The amount of the storage stabilizer, if used, is preferably 1 part or less, more preferably 0.5 parts or less, by mass per 100 parts by mass of the sum of the polymerizable compound of the invention and the liquid crystal compound.

Any known antioxidants may be used, including hydroquinone, 2,6-di(tert-butyl)-p-cresol, 2,6-di(tert-butyl)phenol, triphenyl phosphite, and trialkyl phosphites.

Any known UV absorbers may be used. For example, those imparted UV absorbing ability by salicylic ester compounds, benzophenol compounds, benzotriazole compounds, cyanoacrylate compounds, or nickel complex salt compounds can be used.

The fine particles may be used to adjust the optical (refractive index) anisotropy ($\Delta n$) or enhance the strength of the polymer. The fine particles may be of organic, inorganic or metallic materials. The particle size is preferably 0.001 to 0.1 μm, more preferably 0.001 to 0.05 μm, to prevent flocculation. The particle size distribution is preferably narrow. The amount of the particles, if used, is preferably 0.1 to 30 parts by mass per 100 parts by mass of the sum of the polymerizable compound of the invention and the liquid crystal compound.

The inorganic materials include ceramics, fluorophlogopite, fluorotetrasilicic mica, tainiolite, fluorovermiculite, fluorohectorite, hectorite, saponite, stevensite, montmorillonite, beidellite, kaolinite, fraipontite, ZnO, $TiO_2$, $CeO_2$, $Al_2O_3$, $Fe_2O_3$, $ZrO_2$, $MgF_2$, $SiO_2$, $SrCO_3$, $Ba(OH)_2$, $Ca(OH)_2$, $Ga(OH)_3$, $Al(OH)_3$, $Mg(OH)_2$ and $Zr(OH)_4$. Fine particles having optical anisotropy exemplified by needle-like crystals of calcium carbonate may be used to adjust the optical anisotropy of the polymer.

The organic materials include carbon nanotube, fullerene, dendrimer, polyvinyl alcohol, polymethacrylate, and polyimide.

The polymer as an additive may be added to adjust the electric characteristics or alignment characteristics of the polymer of the invention. The polymer is preferably soluble in the above recited solvent. Examples of such a polymer include polyamide, polyurethane, polyurea, polyepoxide, polyester, and polyester polyol.

The aforementioned optional components of the polymerizable composition other than the liquid crystal compound, the radical polymerization initiator, and the solvent can be used with no particular limitation as long as the characteristics of the resulting polymer are not damaged. Nevertheless, the total amount of the optional components other than the liquid crystal compound, the radical polymerization initiator, and the solvent is preferably not more than 30 parts, more preferably 10 parts or less, by mass per 100 parts by mass of the sum of the polymerizable compound of the invention and the liquid crystal compound.

The polymer of the present invention will then be described.

The polymer of the invention is obtained by, for example, dissolving the polymerizable composition of the invention in a solvent, applying the resulting solution of the polymerizable composition to a substrate, removing the solvent from the coating film in which the liquid crystal molecules of the polymerizable composition have been aligned, and then irradiating the coating film with energy rays to cause polymerization.

Examples of preferred substrates include, but are not limited to, plates of glass, polyethylene terephthalate, polycarbonate, polyimide, polyamide, polymethyl methacrylate, polystyrene, polyvinyl chloride, polytetrafluoroethylene, cellulose, silicone, cycloolefin polymers, or calcite, and a reflector plate. It is preferred to use the above described substrate which has previously formed thereon a polyimide alignment layer or a polyvinyl alcohol alignment layer.

The polymerizable composition solution can be applied to the substrate by any known coating techniques including curtain coating, extrusion coating, roll coating, spin coating, dipping, bar coating, spraying, slide coating, printing, and casting. The thickness of the polymer film is decided as appropriate to the end use, and is preferably 0.001 to 30 µm, more preferably 0.001 to 10 µm, even more preferably 0.005 to 8 µm.

The liquid crystal molecules in the polymerizable composition are aligned by, for example, previously subjecting the substrate to an alignment treatment. Such an alignment treatment of the substrate is preferably carried out by providing a liquid crystal alignment layer, such as a polyimide alignment layer or a polyvinyl alcohol alignment layer, on the substrate, followed by rubbing the alignment layer or a like operation. Molecular alignment may also be achieved by applying a magnetic field or an electric field to the coating film of the polymerizable composition on the substrate.

The polymerizable composition can be polymerized by known processes using light, electromagnetic waves, or heat. Light- or electromagnetic radiation-induced polymerization reactions include radical polymerization, anionic polymerization, cationic polymerization, coordination polymerization, and living polymerization. It is easy by these polymerization reactions to effect polymerization under a condition in which the polymerizable composition exhibits a liquid crystal phase. Crosslinking reaction in a magnetic field or an electric field is also preferred. The liquid crystal (co)polymer formed on the substrate may be used as such or, when needed, stripped off the substrate or transferred onto a different substrate.

Examples of the light include ultraviolet light, visible light, and infrared light. Electromagnetic radiation, such as electron beams and X rays, may also be used. Usually, ultraviolet light or visible light is preferred. A preferred wavelength range is from 150 to 500 nm, more preferably from 250 to 450 nm, even more preferably 300 to 400 nm. Light sources include low pressure mercury lamps (e.g., bactericidal lamps, fluorescent chemical lamps, and black lights), high pressure discharge lamps (e.g., high pressure mercury lamps and metal halide lamps), and short arc discharge lamps (ultrahigh pressure mercury lamps, xenon lamps, and mercury xenon lamps), with high pressure mercury lamps or ultrahigh pressure mercury lamps being preferred. The polymerizable composition may be irradiated with the light as emitted from a light source or a light ray of a specific wavelength or light rays of a specific wavelength range selected through a filter. A preferred irradiation energy density is 2 to 5000 $mJ/cm^2$, more preferably 10 to 3000 $mJ/cm^2$, even more preferably 100 to 2000 $mJ/cm^2$. A preferred illuminance is 0.1 to 5000 $mW/cm^2$, more preferably 1 to 2000 $mW/cm^2$. The temperature during irradiation may be decided so that the polymerizable composition may have a liquid crystal phase and is preferably 100° C. or lower. At temperatures higher than 100° C., thermal polymerization can occur, resulting in a failure to obtain satisfactory alignment.

The polymer of the invention is useful as a formed article with optical anisotropy. Such a formed article finds applications as an optical film for optical compensation, such as a retardation film (e.g., a ½-wave plate or a ¼-wave plate), a polarizer, a dichroic polarizing plate, a liquid crystal alignment layer, an antireflective film, a selectively reflecting film, and a viewing angle compensation film. The formed article also finds use as an optical lens, such as a liquid crystal lens or a microlens, and an information recording material, such as a polymer dispersed liquid crystal (PDLC) type e-paper or a digital paper.

EXAMPLES

The present invention will now be illustrated in greater detail by way of Synthesis Example, Examples, Comparative Examples, and Evaluation Examples, but it should be understood that the invention is not deemed to be limited thereto. Synthesis Example 1 illustrates preparation of a polymerizable compound of the invention. Examples 1 and 2 illustrate preparation of polymerizable compositions of the invention and preparation of polymers using the polymerizable compositions. Evaluation Examples 1 to 4 illustrate evaluation of the physical properties of the polymerizable compositions of Example 1 and Comparative Example 1, coating films obtained from these polymerizable compositions, and the polymers of Example 2 and Comparative Example 2.

Synthesis Example 1

Preparation of Compound No. 7

Compound No. 7 was synthesized following steps 1 to 3.

Step 1: Synthesis of Intermediate 1 (Addition of Dihydropyran)

Intermediate compound 1 was synthesized in accordance with the reaction scheme shown in [Chemical Formula 39] below.

[Chemical Formula 39]

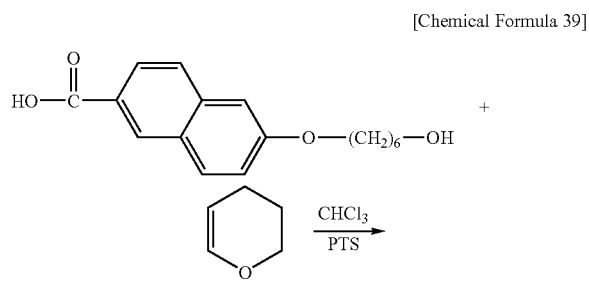

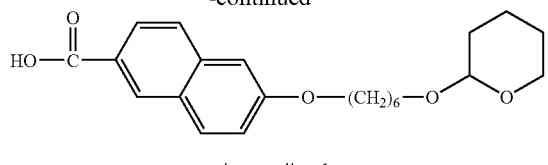

intermediate 1

PTS: p-toluenesulfonic acid

In a nitrogen atmosphere, 15 g of 2-hydroxyhexyloxy-6-naphthoic acid, 0.20 g of p-toluenesulfonic acid (PTS), and 100 g of chloroform were mixed and cooled to 6° C. or lower on an ice bath, and 10.6 g of dihydropyran was added thereto dropwise. After the addition, the ice bath was removed, and the mixture was stirred at room temperature for 3 hours. Water was added to the reaction mixture to effect oil/water separation. The oil phase was washed with water until the washing became neutral, dried over magnesium sulfate, and filtered. To the residue was added 120 ml of hexane, and the suspension was stirred at 25° C. for 30 minutes to give 18.0 g of white crystals (yield: 92.9%; purity: 94.1%).

Step 2: Synthesis of Intermediate 2 (Esterification Followed by Deprotection)

Intermediate 2 was synthesized in accordance with the reaction scheme shown in [Chemical Formula 40] below.

[Chemical Formula 40]

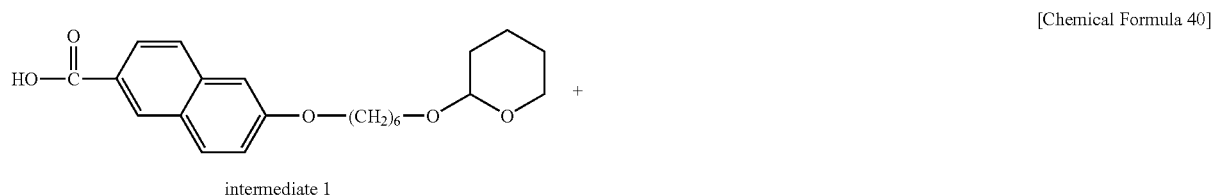

intermediate 1

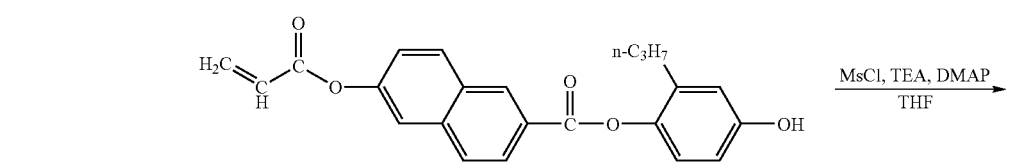

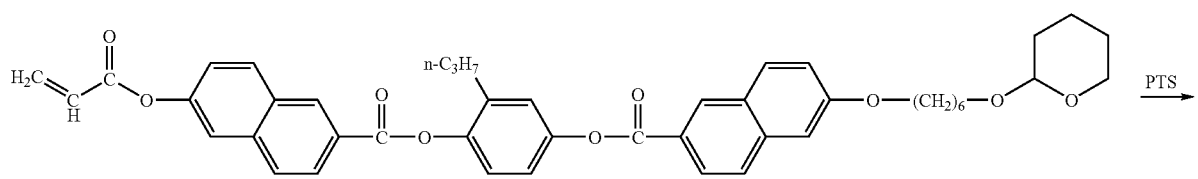

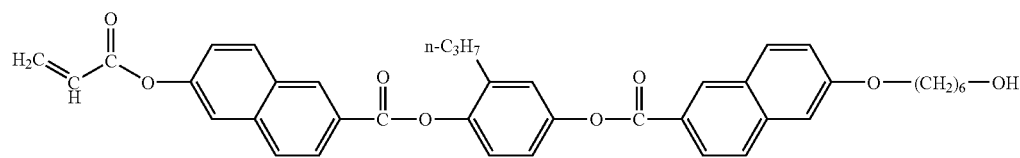

intermediate 2

MsCl: methanesulfonyl chloride; TEA: triethylamine; DMAP: 4-dimethylaminopyridine; THF: tetrahydrofuran; PTS: p-toluenesulfonic acid In a nitrogen atmosphere, 5.8 g of methanesulfonyl chloride and 30 g of tetrahydrofuran (THF) were mixed and cooled to −30° C. in a dry ice bath. A solution of 17.0 g of intermediate 1 prepared in step 1 and 5.6 g of triethylamine (TEA) in 30 g of tetrahydrofuran (THF) was added thereto dropwise while maintaining the temperature of the mixture at −25° C. or lower. After the addition, the mixture was stirred for 1 hour at or below −25° C. To the mixture were added 0.06 g (0.49 mmol) of 4-dimethylaminopyridine (DMAP) and then 5.6 g of triethylamine (TEA). A solution of 17.2 g of 2-acryloyl-6-(3-propyl-4-hydroxyphenyl)oxycarbonylnaphthalene in 60 g of tetrahydrofuran was added thereto dropwise while keeping the temperature of the mixture at −20° C. or lower. The mixture was warmed to 0° C., at which it was stirred for 2 hours. An aqueous hydrochloric acid solution was added to the reaction mixture for oil/water separation. The oily phase was washed with water until the washing became neutral, and 13.8 g of p-toluenesulfonic acid was added thereto, followed by stirring at room temperature for 12 hours. Water and ethyl acetate were added for oil/water separation. The oily phase was washed with water until the washing became neutral, dried over magnesium sulfate, and filtered. The residue was purified by silica gel column chromatography using a 1:2 by volume mixture of hexane and ethyl acetate as a developing solvent to afford 8.3 g (yield: 28.1%) of white crystals.

Step 3: Synthesis of Compound No. 7

Compound No. 7 was synthesized in accordance with reaction scheme shown in [Chemical Formula 41]:

raphy using a 2:1 by volume mixture of hexane and ethyl acetate as a developing solvent to obtain 0.8 g (yield: 29.3%) of white crystals.

The resulting product was identified by $^1$H-NMR and IR spectra to be compound No. 7. The results of the analyses are shown below. The thermal transition behavior of compound No. 7 and optical (refractive index) anisotropy (Δn) of a liquid crystal composition containing compound No. 7 were determined by the methods described below. The results obtained are also shown below.

(1) $^1$H-NMR [CDCl$_3$] (ppm)

0.8-1.0(5H; m), 1.2-1.4(4H; m), 1.5-1.8(6H; m), 18-2.0 (6H; m), 3.1(2H; t), 4.0-4.3(6H; m), 4.4(2H; t), 5.8(1H; dd), 6.0-6.1(2H; m), 6.3-6.4(2H; m), 6.6(1H; d), 7.1-7.3(7H; m), 7.4(1H; dd), 7.70(2H; d), 7.75(2H; dd), 7.8(1H; d), 7.9(1H; d), 8.00(1H; dd), 8.05(1H; d), 8.1(1H; dd), 8.2(1H; dd), 8.52 (1H; s), 8.70(1H; s), 8.82(1H; s)

(2) IR (KBr Tablet Method) (cm$^{-1}$)

475, 590, 687, 764, 856, 914, 937, 988, 1018, 1069, 1123, 1169, 1196, 1273, 1339, 1389, 1474, 1628, 1728, 2866, 2936

(3) Thermal Transition Behavior

Compound No. 7 was analyzed on a differential scanning calorimeter Thermo Plus DSC-8230 from Rigaku Corp. under conditions of a nitrogen atmosphere (50 ml/min), a heating rate of 5° C./min, and a measuring temperature of from 25° C. to 150° C. As a result, the compound showed the following phase transition behavior. Furthermore, compound No. 7 was sandwiched between glass plates, heated on a hot stage, and observed under a polarizing microscope to identify the liquid crystal phase.

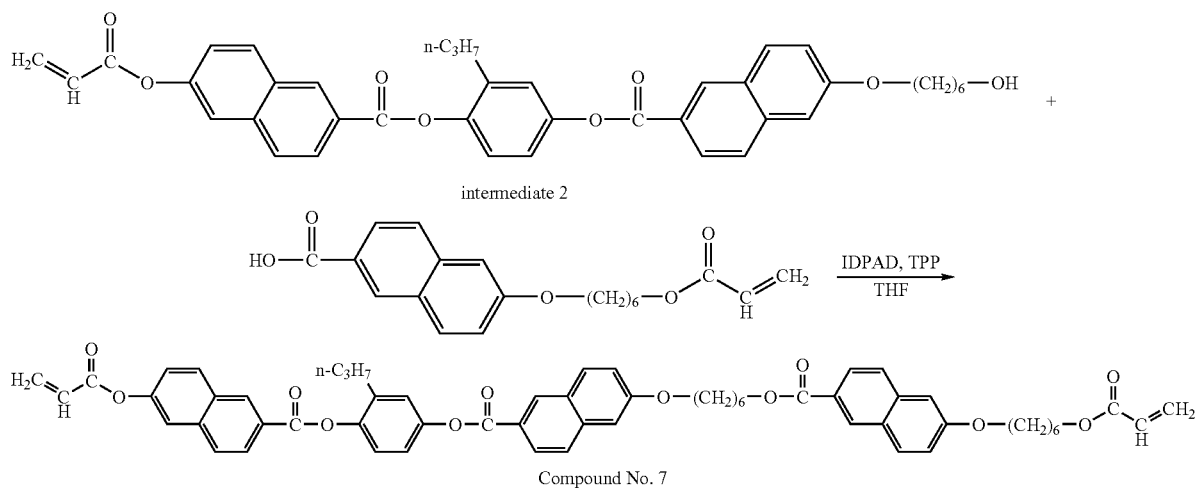

[Chemical Formula 41]

DIPAD: diisopropyl azodicarboxylate; TPP: triphenylphosphine; THF: tetrahydrofuran In a nitrogen atmosphere, 2 g of intermediate 2 prepared in step 2, 0.96 g of 2-acryloylhexyloxy-6-naphthoic acid, 0.81 g of triphenylphosphine (TPP), and 14 g of tetrahydrofuran were mixed and dissolved completely. To the resulting solution was added dropwise 0.81 g of diisopropyl azodicarboxylate (DIPAD), followed by stirring for 2 hours. After completion of the reaction, 5 mg of t-butyl-p-cresol (BHT) was added, and the solvent was removed using a rotary evaporator, and the residue was purified by silica gel column chromatog-

[Chemical Formula 42]

$$C \xrightarrow[f\mathit{c}H=63.80]{92.4} J/g @ \quad @N \xrightarrow[f\mathit{c}H=0.82\,J/g]{142.2} @ @$$

C: crystal phase; N: nematic phase; I: isotropic liquid phase (4) Optical (Refractive Index) Anisotropy (Δn)

A composition obtained by mixing an ester type nematic liquid crystal material having an optical (refractive index) anisotropy (Δn) of 0.0979 with 10% by mass of compound No. 7 had an optical (refractive index) anisotropy (Δn) of 0.1080. This indicates that addition of the polymerizable compound of the invention is effective in increasing the optical anisotropy of a liquid crystal composition.

The ester type nematic liquid crystal material used above was a 4-n-alkylcyclohexanecarboxylic acid alkoxyphenyl ester composition shown in [Chemical Formula 43] below. The measurement was made using monochromatic light of 589 nm at 20° C. with an Abbe refractometer.

[Chemical Formula 43]

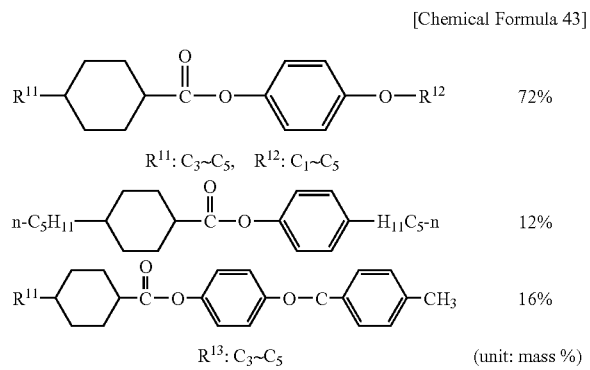

Example 1 and Comparative Example 1

Polymerizable compositions of Examples 1-1 and 1-2 and Comparative Example 1-1 were prepared according to the formulations shown in Table 1.

Evaluation Example 1

Crystal-nematic Phase Transition Temperature (° C.)

The thermal phase transition behavior of each of the polymerizable compositions shown in Table 1 (Examples 1-1 and 1-2 and Comparative Example 1-1) was observed to determine the crystal-nematic phase transition temperature (° C.). Measurement was made using a differential scanning calorimeter Thermo Plus DSC-8230 from Rigaku Corp. under conditions of a nitrogen atmosphere (50 ml/min), a heating rate of 5° C./min, and a measuring temperature of from 25° C. to 150° C. Furthermore, the polymerizable composition of Table 1 was sandwiched between glass plates and observed under a polarizing microscope to confirm the transition to nematic phase. The results of observation are shown in Table 1.

Evaluation Example 2

Solution Stability

The polymerizable compositions of Table 1 were evaluated for solution stability as follows. Each polymerizable composition weighing 1.0 g was dissolved in 1 g of a methyl ethyl ketone solvent. The solution was allowed to stand at 25° C. and observed with the naked eye. A solution that did not precipitate crystals for more than 1 hour was rated "good". A solution that initiated crystallization in a standing period after 15 minutes and up to 1 hour was rated "medium". A solution that initiated crystallization within 15 minutes of standing was rated "bad". The results of evaluation are shown in Table 1.

Evaluation Example 3

Uniformity of Alignment (1) Coating Film Preparation 1

A coating film having a thickness of about 5 μm was made using each of the polymerizable compositions shown in Table 1 in accordance with the following procedure.

Each of polymerizable compositions of Examples 1-1 and 1-2 weighing 2.0 g was dissolved in 4.0 g of a methyl ethyl ketone solvent, and the solution was filtered through a filter with a pore size of 0.45 μm to prepare a polymerizable composition solution of Example 1-1 or 1-2.

A glass plate having polyimide applied thereto and rubbed was prepared. The polymerizable composition solution prepared above was applied to the substrate with a spin coater. The speed and time of rotation of the spin coater were adjusted so as to give a coating film thickness of about 5 μm. The coating film was dried on a hot plate at 100° C. for 3 minutes and allowed to stand at room temperature.

(2) Coating Film Preparation 2

A coating film was prepared in the same manner as in (1) above, except for using the polymerizable composition of Comparative Example 1-1.

(3) Evaluation of Alignment Uniformity

Uniformity of molecular alignment of the coating film obtained in coating film preparation 1 and 2 above was evaluated using a polarizing microscope. A sample was mounted on the rotating stage between crossed nicol polarizers, and the stage was rotated to observe the alignment state of the film. A sample that retained uniform alignment for more than 20 hours after starting to stand at room temperature was rated "good". A sample that retained uniform alignment for more than 4 hours and up to 20 hours was rated "medium". A sample that showed disturbance of alignment within 4 hours was rated "bad". The results of evaluation are shown in Table 1.

Example 2

Preparation of Polymer

A coating film was prepared using each of the polymerizable compositions of Examples 1-1 and 1-2 shown in Table 1 in the same manner as in the coating film preparation 1 of Evaluation Example 3. The coating film as dried on a hot plate at 100° C. for 3 minutes was left to stand at room temperature for 1 minute and, immediately thereafter, irradiated with light of a high pressure mercury lamp (120 W/cm²) for 20 seconds to polymerize and cure to form a polymer.

Comparative Example 2

Preparation of Polymer

A polymer was prepared in the same manner as in Example 2, except for using the polymerizable composition of Comparative Example 1-1.

Evaluation Example 4

Optical (Refractive Index) Anisotropy (Δn)

The retardation (R) and thickness (d) of the polymers obtained in Example 2 and Comparative Example 2 were measured as follows. The optical (refractive index) anisotropy (Δn) of the polymer was calculated by replacing retardation (R) and thickness (d) in the following formula with the resulting measurements.

Optical (refractive index) anisotropy (Δn)=retardation (R)/thickness (d)

The results obtained are shown in Table 1.
(1) Retardation (R)
The retardation (R) at 546 nm of each of the polymers obtained in Example 2 and Comparative Example 2 was determined by birefringence measurement in accordance with the Senarmont method using a polarizing microscope at room temperature (25° C.).
(2) Thickness (d)
The thickness (d) of each of the polymers obtained in Example 2 and Comparative Example 2 was measured with a contact stylus profilometer (Dektak6M from Ulvac Inc.) at room temperature (25° C.).

TABLE 1

| | | Example 1-1 | Example 1-2 | Comp. Example 1-1 |
|---|---|---|---|---|
| Formulation of polymerizable composition (part by mass) | Compound No. 7 | 4.5 | 9 | 0 |
| | Comparative compound 1* | 95.5 | 91 | 100 |
| Physical properties and results of evaluation: | Crystal-nematic phase transition temp. (° C.) | 92.4 | 89.0 | 101.0 |
| | Alignment uniformity | medium | good | bad |
| | Solution stability | medium | good | bad |
| | Optical (refractive index) anisotropy (Δn) | 0.250 | 0.245 | 0.245 |

*Comparative compound 1:

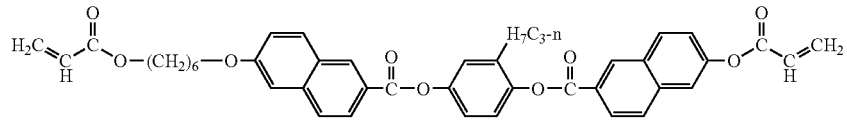

The results in table 1 clearly show the following

The absence of the polymerizable compound of the invention results in a failure to provide a satisfactory polymer film (Comparative Example 1-1). That is, crystallization occurs on the surface, or the alignment is nonuniform.

In contrast, when the polymerizable compound of the invention is used (Examples 1-1 and 1-2), improvements on alignment uniformity and solution stability are obtained, and the resulting polymer exhibits increased optical (refractive index) anisotropy. It is also seen that the polymerizable composition containing the polymerizable compound of the invention has a lowered temperature range for nematic phase, which is advantageous to improve the production line for the polymer production.

It has now been confirmed that the polymer obtained by photopolymerizing the polymerizable composition of the invention containing the polymerizable compound of the invention is excellent in alignment control properties and optical characteristics and is useful as an optical film, such as a polarizer, a retardation film, a viewing angle compensation film, a luminance improving film, or an antireflective film.

INDUSTRIAL APPLICABILITY

The polymerizable compound of the invention and the polymerizable composition containing the same have high solubility in solvent and high compatibility to other liquid crystal compounds. The polymer of the invention, which is obtained by photopolymerizing the polymerizable compound or the polymerizable composition in its aligned liquid crystal state, is excellent in alignment control and optical characteristics and useful as an optical material.

The invention claimed is:

1. A polymerizable compound represented by general formula (1):

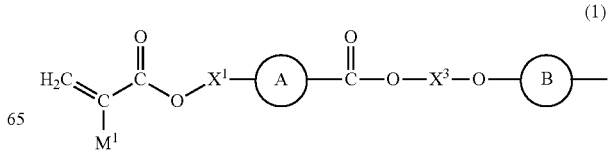

-continued

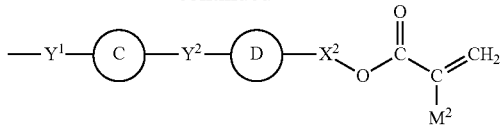

wherein
M¹ and M² each independently represent a hydrogen atom or a methyl group;

X¹ and X² each independently represent a single bond, an optionally branched alkylene group having 1 to 10 carbon atoms, an optionally branched alkyleneoxy group having 1 to 10 carbon atoms bonded to the adjacent ring at the oxygen atom thereof, or an optionally branched alkyleneoxycarbonyloxy group having 1 to 10 carbon atoms;

X³ represents an optionally branched alkylene group having 1 to 10 carbon atoms, the —$CH_2$— moiety of which may be displaced with an oxygen atom, provided that no two oxygen atoms are adjacent to each other;

Y¹ and Y² each independently represent a linking group selected from a single bond, an ester linkage, an ether linkage, an optionally branched alkylene group having 2 to 8 carbon atoms which may have an unsaturated bond, and a combination thereof; and rings A, B, C, and D each independently represent a cyclic structure selected from the group consisting of 1,4-phenylene, 1,4-cyclohexylene, and 2,6-naphthylene, the cyclic structure being optionally substituted with a substituent selected from a halogen atom, an optionally branched alkyl group having 1 to 10 carbon atoms, an optionally branched alkoxy group having 1 to 10 carbon atoms, —CO—O—R¹, —CO—R², or —O—CO—R³, wherein R¹, R², and R³ each represent an optionally branched alkyl group having 1 to 10 carbon atoms.

2. The polymerizable compound according to claim 1, wherein at least one of the cyclic structures represented by rings A, B, C, and D is 2,6-naphthylene.

3. The polymerizable compound according to claim 1, wherein Y¹ and Y² are each —CO—O— or —O—CO—.

4. A polymerizable composition comprising the polymerizable compound according to claim 1.

5. The polymerizable composition according to claim 4, further comprising at least one liquid crystal compound.

6. The polymerizable composition according to claim 5, wherein the polymerizable compound is present in an amount of 1 to 30 parts by mass per 100 parts by mass of the sum of the polymerizable compound and the liquid crystal compound.

7. The polymerizable composition according to claim 5, wherein the liquid crystal compound is represented by general formula (2):

wherein
M³ and M⁴ each independently represent a hydrogen atom, a halogen atom, or a methyl group;

X⁴ and X⁵ each independently represent a single bond, an optionally branched alkylene group having 1 to 10 carbon atoms, an optionally branched alkyleneoxy group having 1 to 10 carbon atoms bonded to the adjacent ring at the oxygen atom thereof, or an optionally branched alkyleneoxycarbonyloxy group having 1 to 10 carbon atoms;

Y³ and Y⁴ each independently represent a linking group selected from a single bond, an ester linkage, an ether linkage, an optionally branched alkylene group having 2 to 8 carbon atoms which may have an unsaturated bond, and a combination thereof; and rings E, F, and G each independently represent a cyclic structure selected from the group consisting of 1,4-phenylene, 1,4-cyclohexylene, 1,4-cyclohexenylene, and 2,6-naphthylene, the cyclic structure being optionally substituted with a substituent selected from a halogen atom, an optionally branched alkyl group having 1 to 10 carbon atoms, an optionally branched alkoxy group having 1 to 10 carbon atoms, —CO—O—R⁴, —O—CO—R⁵, and —CO—R⁶, wherein R⁴, R⁵, and R⁶ each represent an optionally branched alkyl group having 1 to 10 carbon atoms;

m represents an integer of 0 to 3; and when m is 2 or greater, the Y⁴s and the rings G may be the same or different.

8. The polymerizable composition according to claim 4, further comprising a radical polymerization initiator.

9. A polymer obtained by photopolymerizing the polymerizable composition according to claim 4.

10. An optical film for a display device, which is formed of the polymer according to claim 9.

11. The polymerizable compound according to claim 2, wherein Y¹ and Y² are each —CO—O— or —O—CO—.

12. A polymerizable composition comprising the polymerizable compound according to claim 2.

13. A polymerizable composition comprising the polymerizable compound according to claim 4.

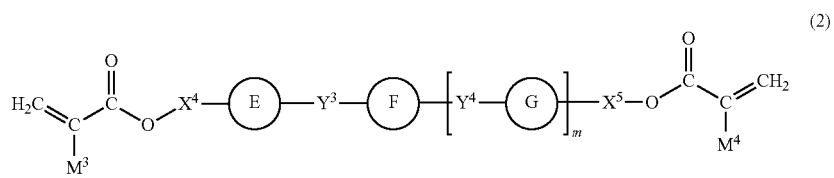

(2)

14. The polymerizable composition according to claim 6, wherein the liquid crystal compound is represented by general formula (2):

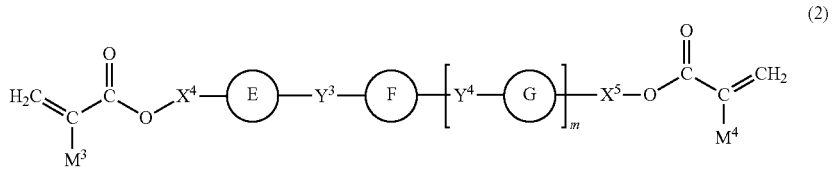

(2)

wherein
- $M^3$ and $M^4$ each independently represent a hydrogen atom, a halogen atom, or a methyl group;
- $X^4$ and $X^5$ each independently represent a single bond, an optionally branched alkylene group having 1 to 10 carbon atoms, an optionally branched alkyleneoxy group having 1 to 10 carbon atoms bonded to the adjacent ring at the oxygen atom thereof, or an optionally branched alkyleneoxycarbonyloxy group having 1 to 10 carbon atoms;
- $Y^3$ and $Y^4$ each independently represent a linking group selected from a single bond, an ester linkage, an ether linkage, an optionally branched alkylene group having 2 to 8 carbon atoms which may have an unsaturated bond, and a combination thereof; and
- rings E, F, and G each independently represent a cyclic structure selected from the group consisting of 1,4-phenylene, 1,4-cyclohexylene, 1,4-cyclohexenylene, and 2,6-naphthylene, the cyclic structure being optionally substituted with a substituent selected from a halogen atom, an optionally branched alkyl group having 1 to 10 carbon atoms, an optionally branched alkoxy group having 1 to 10 carbon atoms, —CO—O—$R^4$, —O—CO—$R^5$, and —CO—$R^6$, wherein $R^4$, $R^5$, and $R^6$ each represent an optionally branched alkyl group having 1 to 10 carbon atoms;
- m represents an integer of 0 to 3; and when m is 2 or greater, the $Y^4$s and the rings G may be the same or different.

15. The polymerizable composition according to claim 5, further comprising a radical polymerization initiator.

16. The polymerizable composition according to claim 6, further comprising a radical polymerization initiator.

17. The polymerizable composition according to claim 7, further comprising a radical polymerization initiator.

18. A polymer obtained by photopolymerizing the polymerizable composition according to claim 5.

19. A polymer obtained by photopolymerizing the polymerizable composition according to claim 6.

20. A polymer obtained by photopolymerizing the polymerizable composition according to claim 7.

* * * * *